(12) United States Patent
Saiki et al.

(10) Patent No.:  US 12,570,237 B2
(45) Date of Patent:     Mar. 10, 2026

(54) POSITION DETERMINATION DEVICE, POSITION DETERMINATION METHOD, AND VEHICULAR ELECTRONIC KEY SYSTEM

(71) Applicant: DENSO CORPORATION, Kariya-city (JP)

(72) Inventors: Takashi Saiki, Kariya-city (JP); Yohei Nakakura, Kariya-city (JP); Kenichiro Sanji, Kariya-city (JP); Yasuhiro Tanaka, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 99 days.

(21) Appl. No.: 18/747,246

(22) Filed: Jun. 18, 2024

(65) Prior Publication Data

US 2024/0336226 A1      Oct. 10, 2024

Related U.S. Application Data

(63) Continuation      of      application      No. PCT/JP2022/045880, filed on Dec. 13, 2022.

(30) Foreign Application Priority Data

Dec. 21, 2021      (JP) ................................. 2021-207406

(51) Int. Cl.
B60R 25/24          (2013.01)
G01S 13/84          (2006.01)
(Continued)

(52) U.S. Cl.
CPC ............ B60R 25/245 (2013.01); G01S 13/84 (2013.01); G07C 9/00309 (2013.01);
(Continued)

(58) Field of Classification Search
CPC ............ B60R 25/245; B60R 2325/205; H04B 17/318; G01S 13/84; G07C 9/00309;
(Continued)

(56) References Cited

U.S. PATENT DOCUMENTS 7,928,829 B2 *   4/2011   Hermann ................ B60R 25/24
                                                      340/5.2
8,427,276 B2 *   4/2013   McBride ............ G07C 9/00309
                                                      340/5.72
(Continued)

FOREIGN PATENT DOCUMENTS

EP          2492876 A       8/2012
JP        2012175518 A      9/2012
(Continued)

*Primary Examiner* — Thomas D Alunkal
(74) *Attorney, Agent, or Firm* — Harness, Dickey & Pierce, P.L.C.

(57)              ABSTRACT

A position determination device includes at least one processor, a first communication device for transmitting a signal in a first frequency band, a second communication device for communicating with a vehicle mobile device using radio waves in a second frequency band different from the first frequency band. The at least one processor acquires first data indicating the reception state at the vehicle mobile device of a signal from the first communication device, acquires second data indicating the distance from the second communication device to the vehicle mobile device, and determines the location of the vehicle mobile device based on the acquired data.

16 Claims, 11 Drawing Sheets

(51) Int. Cl.

| | | |
|---|---|---|
| *G07C 9/00* | (2020.01) | |
| *H04B 17/318* | (2015.01) | |

(52) U.S. Cl.

CPC ...... *H04B 17/318* (2015.01); *B60R 2325/205* (2013.01); *G07C 2009/00793* (2013.01); *G07C 2209/61* (2013.01); *G07C 2209/63* (2013.01)

(58) Field of Classification Search

CPC ...... G07C 2009/00793; G07C 2209/61; G07C 2209/63

See application file for complete search history.

(56) References Cited

U.S. PATENT DOCUMENTS

| | | | | |
|---|---|---|---|---|
| 9,241,235 | B2 * | 1/2016 | Santavicca | G07C 9/00309 |
| 9,988,016 | B1 * | 6/2018 | Bianchi, III | H04W 12/06 |
| 10,124,768 | B1 * | 11/2018 | Bocca | B60R 25/24 |
| 10,471,931 | B2 * | 11/2019 | Naitou | G07C 9/00309 |
| 11,849,329 | B2 * | 12/2023 | Sakamoto | H04W 12/069 |
| 2018/0234797 | A1 * | 8/2018 | Ledvina | G07C 9/29 |
| 2018/0326946 | A1 | 11/2018 | Bocca et al. | |
| 2019/0297457 | A1 * | 9/2019 | Ledvina | H04W 4/023 |
| 2021/0114555 | A1 * | 4/2021 | Hiruta | B60R 25/1001 |
| 2021/0258724 | A1 * | 8/2021 | Nonin | H04W 4/023 |
| 2022/0099818 | A1 * | 3/2022 | Werner | G01S 13/46 |
| 2022/0191644 | A1 * | 6/2022 | Ledvina | H04W 4/023 |
| 2022/0417752 | A1 * | 12/2022 | Mori | H04W 24/10 |
| 2023/0239656 | A1 | 7/2023 | Ledvina et al. | |

FOREIGN PATENT DOCUMENTS

| | | |
|---|---|---|
| JP | 5425446 B2 | 2/2014 |
| JP | 5438048 B2 | 3/2014 |
| JP | 2019105026 A | 6/2019 |
| JP | 6653986 B2 | 2/2020 |
| JP | 2020510567 A | 4/2020 |
| JP | 2020521073 A | 7/2020 |
| JP | 2021066193 A | 4/2021 |
| JP | 2021128083 A | 9/2021 |

* cited by examiner

EA, EA_A

Hv

EA, EA_C

8a 8p          8q          8c

7

8b

EA, EA_B

◯ : BLE COMMUNICATION DEVICE

◇ : LF TRANSMISSION DEVICE

BLE COMMUNICATION DEVICE — 7

COMMUNICATION MICROCOMPUTER — 73

71

TRANSCEIVER — 72

RECEPTION STRENGTH DETECTION UNIT — 721

DISTANCE MEASUREMENT PROCESSOR — 722

D = 0.1m
(or0.05m etc.)

○ : BLE COMMUNICATION DEVICE

◇ : LF TRANSMISSION DEVICE

| POINT NUMBER | DISTANCE [m] | LF_RSSI [dBm] | | | | | AREA TYPE INFORMATION |
|---|---|---|---|---|---|---|---|
| | | ANT. A | ANT. B | ANT. C | ANT. P | ANT. Q | |
| ... | ... | ... | ... | ... | ... | ... | ... |
| 100001 | 0.8 | <−80 | −10< | <−80 | −50±5 | −60±5 | 1B |
| 100002 | ... | ... | | | | | |
| 100003 | ... | | | | | | |
| ... | | | | | | | |

POSITION DETERMINATION DEVICE, POSITION DETERMINATION METHOD, AND VEHICULAR ELECTRONIC KEY SYSTEM

CROSS REFERENCE TO RELATED APPLICATIONS

The present application is a continuation application of International Patent Application No. PCT/JP2022/045880 filed on Dec. 13, 2022, which designated the U.S. and claims the benefit of priority from Japanese Patent Application No. 2021-207406 filed on Dec. 21, 2021. The entire disclosures of all of the above applications are incorporated herein by reference.

TECHNICAL FIELD

The present disclosure relates to techniques for determining a position of a vehicle mobile device carried by a user relative to a vehicle based on a reception condition of a wireless signal transmitted from the vehicle mobile device.

BACKGROUND

An electronic key system for a vehicle determines a position of a vehicle mobile device relative to a vehicle.

SUMMARY

According to at least one embodiment, a position determination device includes at least one processor, a first communication device for transmitting a signal in a first frequency band, a second communication device for communicating with a vehicle mobile device using radio waves in a second frequency band different from the first frequency band. The at least one processor acquires first data indicating the reception state at the vehicle mobile device of a signal from the first communication device, acquires second data indicating the distance from the second communication device to the vehicle mobile device, and determines the location of the vehicle mobile device based on the acquired data.

BRIEF DESCRIPTION OF DRAWINGS

The details of one or more embodiments are set forth in the accompanying drawings and the description below. Other features and advantages will be apparent from the description and drawings, and from the claims.

DETAILED DESCRIPTION

Figure 1:
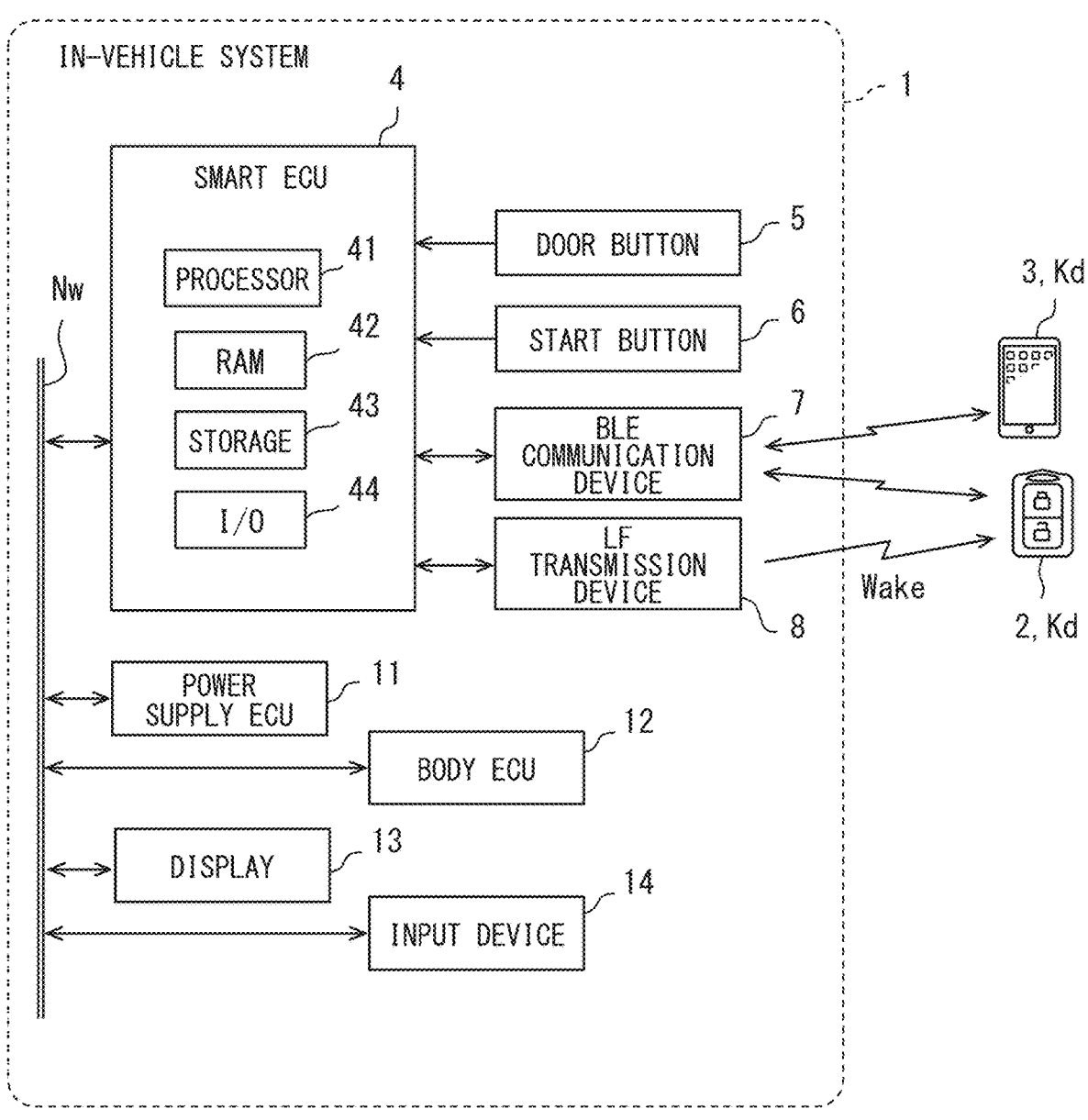
FIG. 1 is a block diagram illustrating a configuration of an in-vehicle system.

To begin with, examples of relevant techniques will be described.

An electronic key system according to a comparative example for a vehicle determines a position of a vehicle mobile device relative to a vehicle by communicating between an in-vehicle device and the vehicle mobile device using radio waves in the low frequency (i.e., LF) band. More specifically, an in-vehicle device of the electronic key system transmits a response request signal using LF band radio waves from a transmitter located in a driver's door, and determines that the vehicle mobile device is present in a locking-unlocking area based on receiving a response signal to the response request signal. The locking-unlocking area is an area where the in-vehicle system locks or unlocks doors of the vehicle, and is an area outside the vehicle compartment that is within a predetermined distance from the doors. The vehicle mobile device is a dedicated device that functions as a vehicle key, and may be called a key fob, a smart key, a key card, or the like.

In a vehicular electronic key system, in a situation where a user is located more than a certain distance away from the vehicle (for example, 2 meters) in view of, for example, it is demanded that an automatic door unlocking through a wireless communication with the vehicle mobile device is not executed as a system requirement. From the viewpoint of security, the above-mentioned locking-unlocking area is often set to an area within 2 meters from the vehicle, such as within 1 meter from the doors.

In many vehicular electronic key systems or position determination systems for vehicles, the radio waves in the LF band are used to transmit signals from the vehicle to the vehicle mobile device because a range of wireless signals is easily limited to a vicinity of the vehicle. An antenna for transmitting the radio wave in the LF band in the vehicle is adjusted in, for example, transmission power to allow the wireless signal reach only in the locking-unlocking area.

In a position determination method using LF signals, a relay attack is a concern. The relay attack is a method for illegally unlocking a vehicle by relaying an LF signal to a vehicle mobile device, which is away from the vehicle using a repeater, thereby forcing the vehicle mobile device to send back a response signal. To address this issue, techniques are being considered that measures a distance to the vehicle mobile device by having a designated communication device perform distance measurement communication with the vehicle mobile device, and if the measured distance value is below a determination value, determines that the vehicle mobile device is within the locking-unlocking area. The determination value is a parameter for the measured distance value for determining that a mobile device is present within a predetermined area such as a locking-unlocking area. The measured distance value is a parameter that indicates the measurement result of the distance to the vehicle mobile device.

However, in the configuration under consideration, erroneous determination may occur depending on an installation position of a communication device that performs distance measurement. The determination value is necessary to be set larger so as to include the locking-unlocking area when the communication device is located in a position that is offset from a center of the locking-unlocking area, such as a left C-pillar of the vehicle. However, if the determination value is set to increase, areas where the measured distance value is less than the determination value may occur or increase even outside the locking-unlocking area. As a result, an incident may occur in which a vehicle mobile device is erroneously determined to be within the locking-unlocking area when in fact the vehicle mobile device is outside the locking-unlocking area.

In contrast to the comparative example, according to a position determination method, and a vehicular electronic key system of the present disclosure, a risk of erroneously determining a position of a vehicle mobile device can be reduced.

According to one aspect of the present disclosure, a position determination device includes at least one processor, a first communication device for transmitting a signal in a first frequency band, a second communication device for communicating with a vehicle mobile device using radio waves in a second frequency band different from the first frequency band. The at least one processor acquires first data indicating the reception state at the vehicle mobile device of a signal from the first communication device, acquires second data indicating the distance from the second communication device to the vehicle mobile device, and determines the location of the vehicle mobile device based on the acquired data.

According to this configuration, the position of the vehicle mobile device is determined using not only the second data indicating the distance between the second communication device and the vehicle mobile device, but also the first data determined according to the conditions of wireless communication using radio waves in a different frequency band. According to this configuration, information for determining the position of the vehicle mobile device is increased compared to a configuration in which the position is determined using only the second data. As a result, possibility of erroneously determining the position of the vehicle mobile device can be reduced.

According to one aspect of the present disclosure, a position determination method is method performed by at least one processor used in connection with a first communication device for transmitting a signal in a first frequency band and a second communication device for communicating with a vehicle mobile device using radio waves in a second frequency band different from the first frequency band. The position determination method acquires first data indicating the reception state at the vehicle mobile device of a signal from the first communication device, acquires second data indicating the distance from the second communication device to the vehicle mobile device, and determines the location of the vehicle mobile device based on the acquired data.

According to one aspect of the present disclosure, a vehicular electronic key system includes a position determination device with at least one processor, a first communication device for transmitting a signal in a first frequency band, a second communication device for wireless communication using radio waves in a second frequency band different from the first frequency band, a vehicle mobile device for receiving the signal from the first communication device and performing wireless communication using the second frequency band, and a mobile terminal for wireless communication using the second frequency band. The vehicle mobile device activates upon receiving a signal in the first frequency band, establishes a wireless communication connection with the position determination device using the second frequency band, transmits data indicating the reception strength of the signal in the first frequency band, transmits a code indicating the device type as the vehicle mobile device, and performs distance measurement with the second communication device. The mobile terminal performs processing related to the communication connection, performs distance measurement with the second communication device, and transmits a code indicating the device type is not the vehicle mobile device. The position determination device acquires second data indicating the distance from the second communication device to the communication partner, acquires a signal indicating the device type from the communication partner, determines whether the device type corresponds to the vehicle mobile device, acquires first data indicating the reception status of the vehicle mobile device, and determines the location of the vehicle mobile device based on the acquired data.

The above-described position determination method and vehicular electronic key system also have the same actions as the position determination device, and thus can provide the same effects as those of the position determination device.

Hereinafter, an embodiment of the present disclosure will be described with reference to the drawings. FIG. 1 is a diagram illustrating an example of a schematic configuration of a vehicular electronic key system. As shown in FIG. 1, the vehicular electronic key system includes an in-vehicle system 1 and a smart key 2. The vehicular electronic key system also includes one or more mobile terminals 3 as optional elements. The in-vehicle system 1 is a system mounted on a vehicle Hv. The smart key 2 is a dedicated device serving as an electronic key for the vehicle Hv. The mobile terminal 3 is a general-purpose information processing terminal carried by a user of the vehicle Hv.

Introduction

The vehicle Hv in the following description is, for example, a vehicle owned by an individual. A user of the vehicle Hv refers to an owner, a family of the owner, or the like. The vehicle Hv may be a company vehicle owned by a company organization or a public vehicle owned by a public institution. When the vehicle Hv is the company vehicle or the public vehicle, the user may be a person belonging to an organization that manages the vehicle Hv. In addition, the vehicle Hv may be a vehicle provided for a vehicle rental service (so-called rental vehicle) or a vehicle provided for a car-sharing service (so-called shared vehicle). The vehicle Hv may be a vehicle provided for a passenger transportation service such as a robot taxi. When the vehicle Hv is a vehicle provided for the above services (hereinafter referred to as a service vehicle), a person who has a contract to use these services and who has an authority to temporarily use the vehicle Hv based on using reservation of the services, or the like can be a user.

The vehicle Hv is, for example, an engine vehicle. The engine vehicle refers to a vehicle including only an engine as a driving source. The engine vehicle also includes a diesel vehicle. Alternatively, the vehicle Hv may be an electric motor vehicle. The electric motor vehicle includes a hybrid vehicle and a fuel cell vehicle in addition to an electric vehicle. The electric vehicle is a vehicle including only a motor as a driving source. The hybrid vehicle is a vehicle including an engine and a motor as driving sources. The hybrid vehicle includes a plug-in hybrid vehicle. The vehicle Hv may be a vehicle provided with a driver's seat door, and can be mounted on various vehicles capable of traveling on a road, such as a trailer, a tank lorry, and an open car.

The vehicle Hv is a vehicle provided with a driver's seat on a right side. Alternatively, the vehicle Hv may be a vehicle provided with a driver's seat on a left side. Front-rear, left-right, and up-down directions described below are defined based on the vehicle Hv when there is no annotation regarding a reference direction (that is, basically). Each of the various flowcharts shown in the present disclosure is an example, and the number of steps constituting the flowchart and the execution order of the process can be appropriately changed. In addition, the following description can be appropriately modified so as to conform to the regulation and the conventional practice of the region where the vehicle Hv is used.

Overall Overview

The in-vehicle system 1, the smart key 2, and the mobile terminal 3 are capable of short-range communication. The short-range communication refers to communication conforming to a predetermined short-range wireless communication standard in which a substantial communicable distance is, for example, about 5 m to 30 m and a maximum communicable distance is about 100 m. A method of the short-range communication may be Bluetooth (registered trademark), Wi-Fi (registered trademark), or the like. The Bluetooth standard may be Bluetooth Classic or Bluetooth Low Energy (i.e., BLE). A variety of Wi-Fi standards can be adopted, including IEEE802.11n, IEEE802.11ac, and IEEE802.11ax. The IEEE (registered trademark) is an abbreviation for Institute of Electrical and Electronics Engineers, and refers to the American Institute of Electrical and Electronics Engineers. In addition, as a communication method between the in-vehicle system 1 and the mobile terminal 3, in other words, as a short-range communication method, Ultra Wide Band-Impulse Radio (UWB-IR) using a frequency band of 3 GHz or higher may be adopted. The short-range communication is carried out using high-frequency radio waves. In the present disclosure, the high frequency radio waves are radio waves of 900 MHz or higher, such as 2.4 GHz. The high-frequency radio waves in the present disclosure is not limited to radio waves of 1 GHz or more, and includes radio waves of a sub-gigahertz band such as 920 MHz.

In the following, as an example, the operation of each part will be explained using a case where the in-vehicle system 1, the smart key 2, and the mobile terminal 3 each carry out wireless communication conforming to the BLE standard (hereinafter, BLE communication) as short-range communication. In the present disclosure, a wireless signal transmitted and received in BLE communication is also referred to as a BLE signal. The BLE signal transmitted from the smart key 2 or the mobile terminal 3 to the in-vehicle system 1 includes a device ID (i.e., identification) as information indicating a transmission source.

A case where the in-vehicle system 1 is set to act as a master in communication with the mobile terminal 3 and the mobile terminal 3 is set to act as a slave will be described. As another aspect, the mobile terminal 3 may be set to operate as a master in communication with the in-vehicle system 1.

The in-vehicle system 1 and the smart key 2 are capable of performing wireless communication using radio waves in the LF band such as 125 kHz or 134 KHz. That is, the in-vehicle system 1 is configured to transmit an LF signal, which is a signal having a predetermined frequency in the LF band, and the smart key 2 is configured to be able to receive the LF signal. In this example, the LF band refers to a frequency band of 300 KHz or less, and includes a frequency of 20 KHz to 30 KHz or the like. The smart key 2 returns response data corresponding to the received LF signal to the in-vehicle system 1 via BLE communication.

The smart key 2 and the mobile terminal 3 are devices that hold key information for using the vehicle Hv and function as an electronic key for the vehicle Hv using the key information. The key information is data used in an authentication process described later. The key information is data for certifying that the person who attempts to access the vehicle Hv is the user, that is, validity of the person who attempts to access the vehicle Hv. The key information can be called an authentication key, an encryption key, or a key code. The key information can be, for example, a character string (value) encrypted by inputting a password set by the user into a predetermined hash function. The key information may be generated based on a device ID. In the present disclosure, the smart key 2 and the mobile terminal 3 are collectively referred to as a key device Kd. The following description of the key device Kd can be replaced with the smart key 2 or the mobile terminal 3.

The key information may differ for each key device Kd. In the in-vehicle system 1, key information for each key device Kd is stored and registered in association with a device ID. The key device Kd may be distinguished by a key ID that is assigned by the vehicle Hv in the order of registration, instead of by the device ID. The device ID is expressed in a length of about 48 bits or 128 bits, whereas the key ID can be expressed in a few bytes, such as 1 byte.

<Smart Key 2>

The smart key 2 is a dedicated device for the user to operate the vehicle Hv. The smart key 2 is a device that is provided with the owner together with the vehicle Hv when the vehicle Hv is purchased. The smart key 2 is basically possessed by the owner. The smart key 2 can be regarded as one of accessories of the vehicle Hv. The smart key 2 may have various shapes such as a flat rectangular parallelepiped shape, a flat elliptical shape (so-called fob type), and a card shape. The smart key 2 may be referred to as a vehicle mobile device, a key fob, a key card, an access key, or the like.

Figure 2:
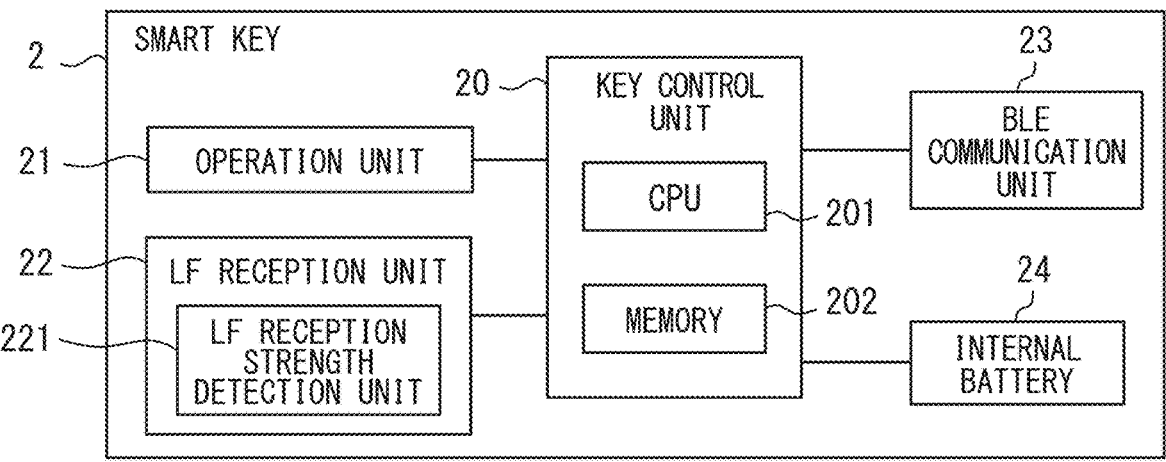
FIG. 2 is a block diagram illustrating a configuration of a smart key.

As shown in FIG. 2, the smart key 2 includes a key control unit 20, an operation unit 21, an LF reception unit 22, a BLE communication unit 23 and an internal battery 24.

The operation unit 21 is a member to receive a user operation on the smart key 2. The operation unit 21 may be a push switch or the like. The operation unit 21 may include switches. For example, the operation unit 21 may include a locking switch that is a switch for locking the doors of the vehicle Hv and an unlocking switch that is a switch for unlocking the doors of the vehicle Hv. The smart key 2 wirelessly transmits a remote control signal corresponding to a switch operated by a user to a smart ECU 4 to provide a so-called remote keyless entry system configured to perform control such as locking or unlocking of vehicle doors.

The LF reception unit 22 receives an LF signal. The LF reception unit 22 may adopt antenna for receiving the LF signal or a circuit (so-called demodulation circuit) for modulating the received signal. The LF reception unit 22 extracts data included in the reception signal by performing predetermined processing such as analog-digital conversion, demodulation, and decoding on the signal received by the antenna. The extracted data is provided to the key control unit 20. The LF reception unit 22 outputs, in addition to the received data, data indicating reception strength of the LF signal transmitted from the in-vehicle system 1 to the key control unit 20. A signal indicating the reception strength or a measurement value thereof may be referred to as a received signal strength indicator/indication (i.e., RSSI). In the present disclosure, the reception strength of the LF signal detected by the smart key 2 is also referred to as LF strength or LF_RSSI.

The BLE communication unit 23 is a communication module for the BLE. The BLE communication unit 23 operates under control of the key control unit 20. For example, an operation state of the BLE communication unit 23 is switched by the key control unit 20. The BLE communication unit 23 has an active state in which it is capable of transmitting and receiving advertising signals and the like, and an inactive state in which it is unable to transmit and receive BLE signals. The inactive state may be an unpowered state. The internal battery 24 is a power source that supplies electric power for operations of the smart key 2. The internal battery 24 is a primary battery such as a lithium battery.

The key control unit 20 includes a microcontroller having a central processing device (i.e., CPU) 201 and a memory 202. The key control unit 20 may be realized using an integrated circuit (i.e., IC) or a field-programmable gate array (i.e., FPGA). The memory 202 stores key-related information. The key-related information includes key information and the vehicle ID linked to the smart key 2.

The key control unit 20 is activated when the LF reception unit 22 receives a wake signal having a strength equal to or greater than a predetermined threshold, and causes the entire smart key 2 to transition from the sleep mode to the active mode. The active mode is an operation mode in which BLE communication is possible, and corresponds to an operation mode in which the BLE communication unit 23 is set to an active state. The sleep mode is an operating mode that reduces power consumption by limiting the functions that can be executed compared to the active mode. The sleep mode corresponds to an operation mode in which the BLE communication unit 23 is set to an inactive state.

In addition, the key control unit 20 is capable of transition from the sleep mode to the active mode when the operation unit 21 is operated, other than when the wake signal is received. That is, the key control unit 20 activates the BLE communication unit 23 when triggered by receipt of the wake signal or a user operation on the operation unit 21. In addition, when a state where no communication connection to the in-vehicle system 1 is detected continues for a given period in the active mode and when a state where the operation unit 21 is not operated continues for a given period, the key control unit 20 shifts the smart key 2 to the sleep mode.

In the active mode, the key control unit 20 acquires information indicating a communication connection state with the in-vehicle system 1 and received data from the in-vehicle system 1 from the BLE communication unit 23. When the BLE communication unit 23 receives a challenge code, the key control unit 20 generates a response code using the key information stored in the memory 202 and causes the BLE communication unit 23 to transmit the response code. The key control unit 20 also causes the BLE communication unit 23 to transmit a control signal according to content of the operation when the operation unit 21 is operated.

The key control unit 20 stores the LF_RSSI for a certain period of time in association with information indicating the source of the signal (for example, a transmitter number) when the LF reception unit 22 receives the wake signal. In addition, the key control unit 20 causes the BLE communication unit 23 to transmit an LF strength report to the in-vehicle system 1 based on a request from the in-vehicle system 1 or spontaneously (periodically). The LF strength report is a BLE signal that includes data indicating the LF_RSSI for each source. The LF_RSSI for each transmission source corresponds to first data.

Even in the in-vehicle system 1 configured to allow the mobile terminal 3 to be used as an electronic key as disclosed herein, it is foreseen that the smart key 2 will continue to be sold or distributed as an accessory to the vehicle as proof of ownership or as a physical master key. It is also assumed that some users may choose to continue using the smart key 2 as a vehicle key rather than the mobile terminal 3 due to their own preferences. In other words, the in-vehicle system 1 may be required to be capable of communicating with both the smart key 2 and the mobile terminal 3.

<Mobile Terminal 3>

The mobile terminal 3 is a portable and general-purpose information processing terminal having a BLE communication function. As the mobile terminal 3, various communication terminals such as a smartphone and a wearable device can be adopted. The wearable device is a device that is worn and used on the user's body, and can be of various shapes such as a wristband type, a wristwatch type, a ring type, a glasses type, and an earphone type.

Figure 3:
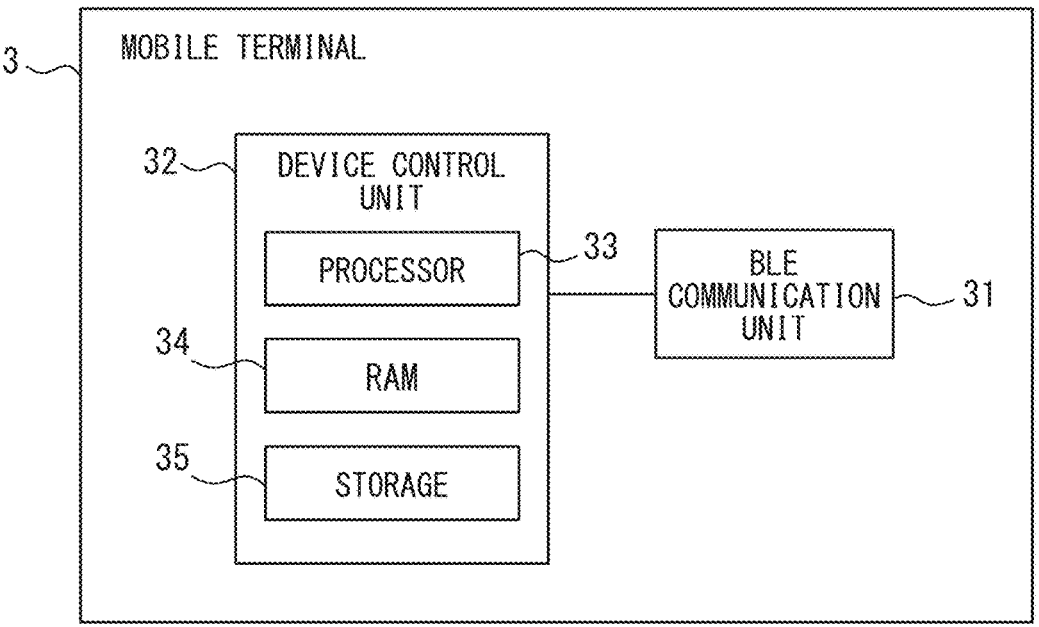
FIG. 3 is a block diagram illustrating a configuration of a mobile terminal.

As shown in FIG. 3, the mobile terminal 3 includes a BLE communication unit 31 and a device control unit 32. The BLE communication unit 31 is a communication module for executing BLE communication. The device control unit 32 executes various arithmetic processes. The device control unit 32 is configured as a computer including, for example, a processor 33, a random access memory (i.e., RAM) 34, and a storage 35. A digital key app, which is an application for causing the mobile terminal 3 to function as an electronic key for the vehicle Hv, is installed in the storage 35. Furthermore, the storage 35 stores the key information. Similarly to the key control unit 20, the device control unit 32 also performs processes related to communication connection and authentication with the in-vehicle system 1. That is, the device control unit 32 cooperates with the BLE communication unit 31 to periodically transmit advertising signals and return response codes.

<Configuration of In-Vehicle System 1>

A configuration and an operation of the in-vehicle system 1 will be described. As shown in FIG. 1, the in-vehicle system 1 includes a smart ECU 4, a door button 5, a start button 6, a BLE communication device 7 and an LF transmission device 8. The in-vehicle system 1 also includes a power supply ECU 11, a body ECU 12, a display 13, and an input device 14. The "ECU" is used as an abbreviation for electronic control unit, and indicates any kind of electronic control device.

The smart ECU 4 is connected to the door button 5, the start button 6, and the BLE communication device 7 by dedicated signal lines. The smart ECU 4 is connected to the power supply ECU 11, the body ECU 12, and the like via an in-vehicle network Nw so as to be able to communicate with each other. The in-vehicle network Nw is a communication network constructed in the vehicle Hv. A standard of the in-vehicle network Nw may be any standard. A connection mode of the devices illustrated in FIG. 1 is an example, and a specific connection mode of the devices can be appropriately changed.

The smart ECU 4 is an ECU that determines a device position with respect to the vehicle Hv in cooperation with the BLE communication device 7 or the like and performs vehicle control according to the determination result of the device position. The device position in the present disclosure means a position of the key device Kd. Since the key device Kd is carried by the user, determining the device location is equivalent to determining the user's location. The smart ECU 4 corresponds to a position determination device. The smart ECU 4 is located in an instrument panel. The smart ECU 4 may be attached to an in-cabin side surface of a right or left C pillar. The C pillar refers to the third pillar from the front among pillars of the vehicle Hv.

The smart ECU 4 is realized by using a computer. That is, the smart ECU 4 includes a processor 41, a RAM 42, a storage 43, an input-output module 44, and a bus line connecting these components.

The processor 41 is hardware (in other words, an arithmetic core) for calculation processing combined with the RAM 42. The processor 41 is, for example, a CPU. The processor 41 executes various types of processing for implementing a function of each functional unit described later, by accessing the RAM 42. The RAM 42 is a volatile storage medium. The storage 43 includes a nonvolatile storage medium such as a flash memory. The storage 43 stores a control program executed by the processor 41. Execution of the control program by the processor 41 corresponds to execution of the position determination method corresponding to the control program. The input-output module 44 is a circuit module for communicating with another device.

In the storage 43, the device ID of each key device Kd is registered. The storage 43 stores communication device setting data indicating an installation position of each BLE communication device 7 in the vehicle Hv. The installation position of each BLE communication device 7 may be expressed as, for example, a point on a vehicle coordinate system that is a two-dimensional coordinate system having any position of the vehicle Hv as a center and parallel to both a width direction and a front-rear direction of the vehicle Hv. An X-axis forming the vehicle coordinate system can be set parallel to the vehicle width direction, and a Y-axis can be set parallel to the front-rear direction of the vehicle. As the center of the coordinate system, for example, any position such as a center of a vehicle body or the installation position of the smart ECU 4 can be adopted. Of course, the vehicle coordinate system may be a three-dimensional coordinate system including a Z-axis parallel to an up-down direction of the vehicle. Details of the smart ECU 4 will be described later.

The door button 5 is a switch for the user to unlock and lock a door of the vehicle Hv. The door button 5 is provided at an outer door handle provided on each door. The outer door handle is a gripping member provided on an outer side surface of the door for opening and closing the door. When being pressed by the user, the door button 5 outputs an electric signal indicating the fact to the smart ECU 4. A touch sensor may be adopted as a configuration for receiving at least one of an unlocking instruction and a locking instruction from the user. The touch sensor may be provided at the outer door handle instead of the door button 5 or together with the door button 5.

The start button 6 is a push switch for the user to switch on/off a traveling power source. The traveling power source is a power source for running the vehicle Hv. The traveling power source may be called an ignition power source when the vehicle is an engine vehicle. The traveling power source indicates a system main relay when the vehicle Hv is an electric vehicle or a hybrid vehicle. The start button 6 corresponds to a switch for starting a driving source (for example, an engine). The start button 6 outputs an electric signal indicating the fact to the smart ECU 4 when being pressed by the user.

Figure 4:
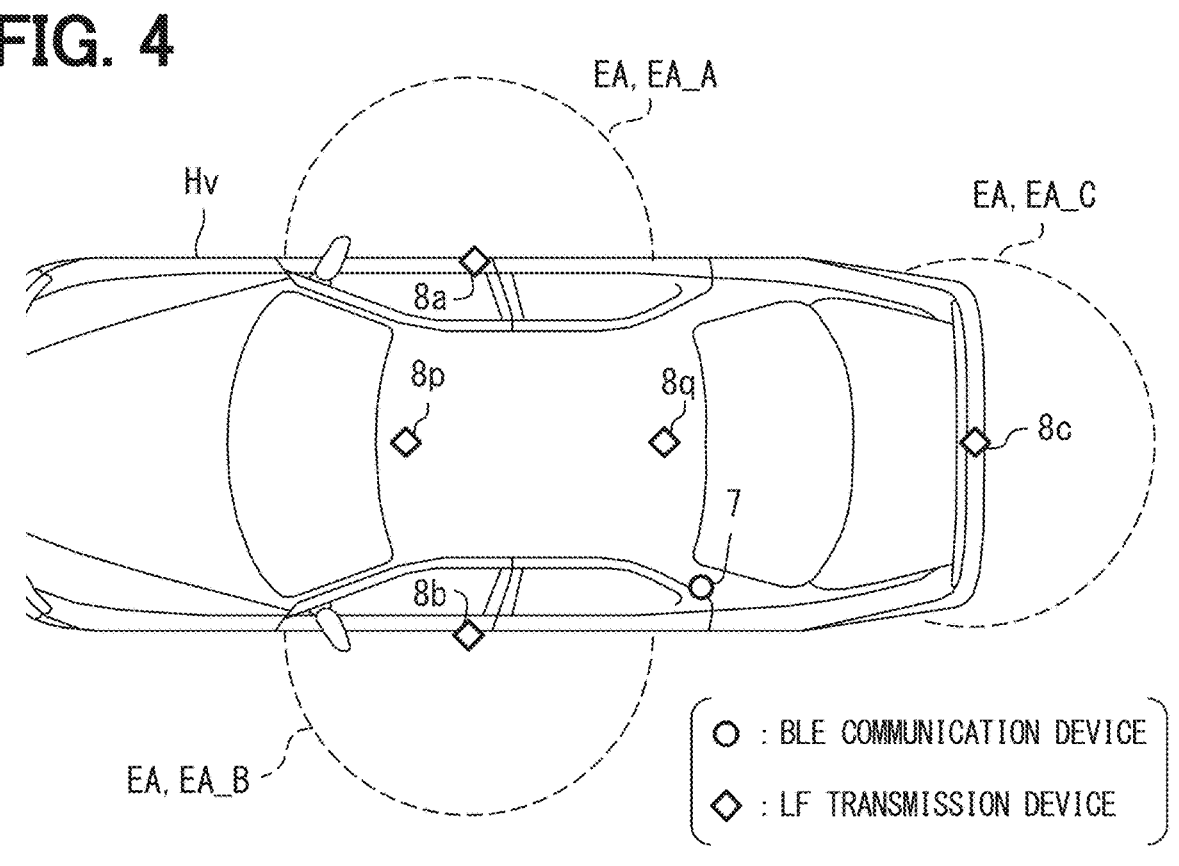
FIG. 4 is a diagram illustrating an example of installation positions of BLE communication devices and LF transmission devices.

The BLE communication device 7 is a communication module for performing wireless communication with the key device Kd according to the BLE standard. At least one BLE communication device 7 is provided in the vehicle Hv. As an example, the in-vehicle system 1 of the present embodiment includes only one BLE communication device 7, as shown in FIG. 4. The BLE communication device 7 is provided, for example, on the interior side surface of the left C-pillar. The location where the BLE communication device 7 is mounted is not limited to the C-pillar, but may be a B-pillar, an instrument panel, a center console, an interior ceiling, an upper end of a windshield, or the like. The B pillar refers to the second pillar from the front among the pillars of the vehicle Hv. The B pillar may also be referred to as a center pillar. The BLE communication device 7 is connected to the smart ECU 4 via a dedicated communication line or the in-vehicle network Nw so as to mutually communicate with the smart ECU 4. In another embodiment, the BLE communication device 7 may be built into the smart ECU 4. In addition, BLE communication devices 7 may be distributed at multiple locations in the vehicle Hv. The BLE communication device 7p corresponds to a second communication device.

The LF transmission device 8 is a device that transmits an LF signal based on an instruction from the smart ECU 4. The LF transmission device 8 transmits a wake signal based on an input signal from the smart ECU 4. The wake signal is an LF signal for transitioning the smart key 2 to the active mode. The LF transmission device 8 includes an LF transmission antenna and an LF transmission circuit. The LF transmission circuit is a circuit that performs predetermined signal processing such as digital-to-analog conversion, frequency conversion, and modulation. The LF transmission circuit may be provided in the smart ECU 4.

The in-vehicle system 1 of the present embodiment includes LF transmission devices 8a, 8b, 8c, 8p, 8q. An LF transmission device 8a of the LF transmission devices is disposed at the outer door handle for a driver's seat. An LF transmission device 8b of the LF transmission devices is disposed at the outer door handle for a passenger's seat. An LF transmission device 8c of the LF transmission devices is provided in a vicinity of a trunk door. An LF transmitters 8p and an LF transmission device 8q of the LF transmission devices are arranged inside the vehicle compartment. The LF transmission device 8p is disposed at a center of the instrument panel in the vehicle width direction or at a front portion of the driver's seat so that the front seats are included in a main communication area. The LF transmission device 8q is disposed near a seating surface or feet of a rear seat. Each LF transmission device 8 is assigned with a predetermined transmitter number. The transmitter number corresponds to information indicating a source of the LF signal. The LF transmission device 8 corresponds to a first communication device.

The power supply ECU 11 is an ECU that controls on and off states of the traveling power source mounted on the vehicle Hv. For example, the power supply ECU 11 switches the traveling power source from off to on based on an instruction signal from the smart ECU 4. The power supply ECU 11 starts the engine based on the instruction signal from the smart ECU 4 when the vehicle Hv is an engine vehicle.

The body ECU 12 is an ECU that controls the body system actuator based on a request from the smart ECU 4 or the user. The body ECU 12 is communicably connected to various body system actuators and various body system sensors. The body system actuator is, for example, a door lock motor constituting a locking mechanism of each door. A body system sensor 192 includes a courtesy switch and the like disposed for each door. The courtesy switch is a sensor for detecting opening and closing of the door. The body ECU 12 locks or unlocks each door by outputting a predetermined control signal to a door lock motor provided on each door of the vehicle Hv, for example, based on a request from the smart ECU 4.

The display 13 is, for example, a liquid crystal display or an organic EL display. The display 13 displays an image corresponding to an input signal from the smart ECU 4. The display 13 is disposed, for example, in a central region of the instrument panel in the vehicle width direction or a front region of the driver's seat. The display 13 corresponds to an in-vehicle display.

The input device 14 is a device for receiving an instruction operation of the user on the smart ECU 4. The input device 14 may be a touch panel laminated on the display 13. The input device 14 may be a mechanical switch provided on the instrument panel, or the like. The input device 14 outputs, as an operation signal, an electric signal corresponding to an operation performed by the user on the device to the smart ECU 4. The operation signal output by the input device 14 indicates operation content of the user. The display 13 and the input device 14 correspond to an interface for an operator at a dealer shop or manufacturing plant to register strength map data, which will be described later, in the smart ECU 4. The display 13 and the input device 14 are collectively referred to as an in-vehicle HMI. The "HMI" is an abbreviation for Human Machine Interface.

<Configuration of BLE Communication Device>

Figure 5:
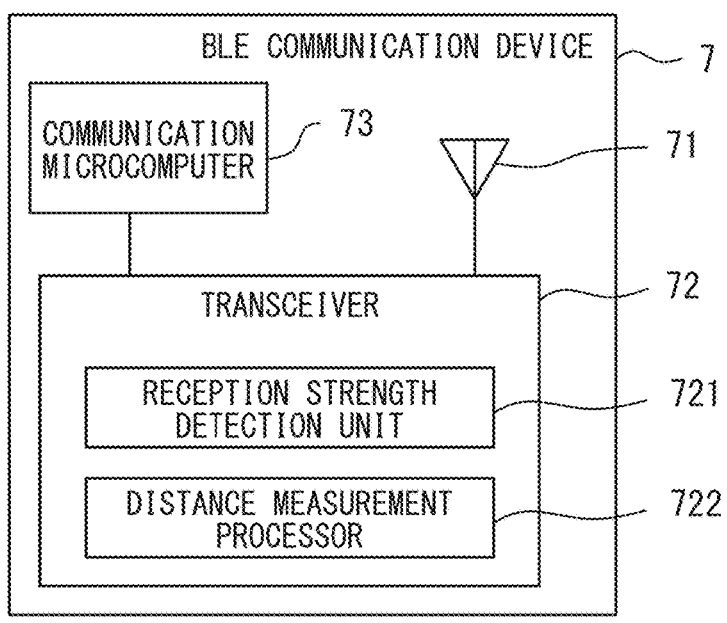
FIG. 5 is a block diagram illustrating a configuration of a BLE communication device.

As shown in FIG. 5, each BLE communication device 7 includes an antenna 71, a transceiver 72, and a communication microcomputer 73. The antenna 71 is a metal body for transmitting and receiving radio waves in a frequency band used for BLE communication, that is, a 2.4 GHz band. The antenna 71 is electrically connected to the transceiver 72. The antenna 71 may be an array antenna formed by arranging multiple antenna elements side by side. The 2.4 GHz band corresponds to a second frequency band. The 2.4 GHz band can refer to 2402 MHz to 2480 MHz (or 2495 MHZ).

The transceiver 72 demodulates a signal received by the antenna 71 and provides the demodulated signal to the communication microcomputer 73. The transceiver 72 modulates, via the communication microcomputer 73, a signal received from the smart ECU 4, outputs the modulated signal to the antenna 71, and radiates the modulated signal as radio waves. The transceiver 72 is connected to the communication microcomputer 73 so as to be able to communicate with each other. The transceiver 72 includes a reception strength detection unit 721 and a distance measurement processor 722 in addition to a modulator-demodulator circuit. The reception strength detection unit 721 sequentially detects the strength of signals received by the antenna 71. The reception strength detected by the reception strength detection unit 721 is output to the communication microcomputer 73 together with the device ID indicating a transmission source of the received signal and frequency information of the received signal. In the present disclosure, the reception strength of a BLE signal is also referred to as BLE_RSSI.

The distance measurement processor 722 performs distance measurement communication with the communication partner, thereby generating a distance correspondence value that indirectly indicates the distance from the BLE communication device 7 to the communication partner. The distance correspondence value is a parameter indicating a time of flight of a signal transmitted from the key device Kd until the signal is received by the BLE communication device 7. The distance correspondence value is a parameter different from the reception strength. More specifically, the distance correspondence value is a round-trip time (RTT) or a two-frequency phase difference. The distance measurement communication can be referred to as communication for measuring the RTT or the two-frequency phase difference. The distance correspondence value indicates the signal time of flight (ToF) for one way or round trip, and therefore can be called a ToF-related value. The distance correspondence value such as the RTT and the two-frequency phase difference corresponds to the measured distance value and second data.

The RTT is measured as a time from when a response request signal is sent to a communication partner until a response signal is received from the communication partner. The distance measurement processor 722 may use as the RTT a value obtained by applying a predetermined correction process, such as subtracting an assumed value of a response processing time generated by the key device Kd or an assumed value of a delay time that may be generated by the BLE communication device 7, to the elapsed time between the actual transmission and reception of the signal.

The two-frequency phase difference is a parameter specified by the BLE communication device 7 and the key device Kd transmitting and receiving a continuous wave (CW) signal, and is a difference of a transmission and reception phase difference observed at each of two frequencies. The transmission and reception phase difference at a certain frequency corresponds to a phase difference between the CW signal of a target frequency transmitted to a target and the CW signal of the target frequency returned from the target.

The transmission and reception phase difference may be simply referred to as a phase angle. The transmission and reception phase difference may be an average value or total value of the phase difference between the transmission signal and the reception signal detected by each device when the BLE communication device 7 and the key device Kd transmit and receive CW signals to each other. The distance measurement processor 722 may adopt a reception phase of the CW signal transmitted from the key device Kd as the transmission and reception phase difference without change on an assumption that initial phases or local oscillators are synchronized between devices. The initial phase or local oscillator synchronization between the devices can be implemented by, for example, transmitting a predetermined synchronization signal. The transmission and reception phase difference for each frequency that is a source of the two-frequency phase difference may also be treated as a type of measured distance value. The two-frequency phase difference corresponds to a displacement amount of the transmission and reception phase difference due to a change in frequency.

Based on instructions from the smart ECU 4, the BLE communication device 7 performs distance measurement communication with the smart key 2 or the mobile terminal 3, generates a distance correspondence value, and reports it to the processor 41. In a more preferred embodiment of the present embodiment, the distance measurement processor 722 calculates both the RTT and the two-frequency phase difference. The distance measurement processor 722 calculates the two-frequency phase difference for each combination of frequencies used in BLE communication. The distance correspondence value may be generated or calculated by the communication microcomputer 73 or the smart ECU 4. The distance measurement processor 722 may identify the transmission and reception phase difference for each frequency, and the smart ECU 4 may calculate the two-frequency phase difference for each combination of frequencies based on the transmission and reception phase difference for each frequency. Functional sharing between the BLE communication device 7 and the smart ECU 4 can be changed as appropriate.

The communication microcomputer 73 is a microcontroller that controls data exchange with the smart ECU 4. The communication microcomputer 73 is implemented using a CPU, a RAM, a read only memory (ROM), and the like. The communication microcomputer 73 provides reception data received from the transceiver 72 to the smart ECU 4 sequentially or based on a request from the smart ECU 4. In addition, the communication microcomputer 73 outputs to the smart ECU 4 data relating to the reception condition of signals from the key device Kd and distance correspondence values, either in response to a request from the smart ECU 4 or spontaneously.

The BLE communication device 7 may calculate a direction of arrival of a signal from the key device Kd and output the direction of arrival of the signal to the smart ECU 4 as information indicating the reception condition of the signal from the key device Kd. The direction of arrival of a signal can be estimated by various methods such as the MUSIC method or the ESPRIT method. The reception strength, phase, and direction of arrival can be called received signal characteristics.

<Functions of Smart ECU 4>

Figure 6:
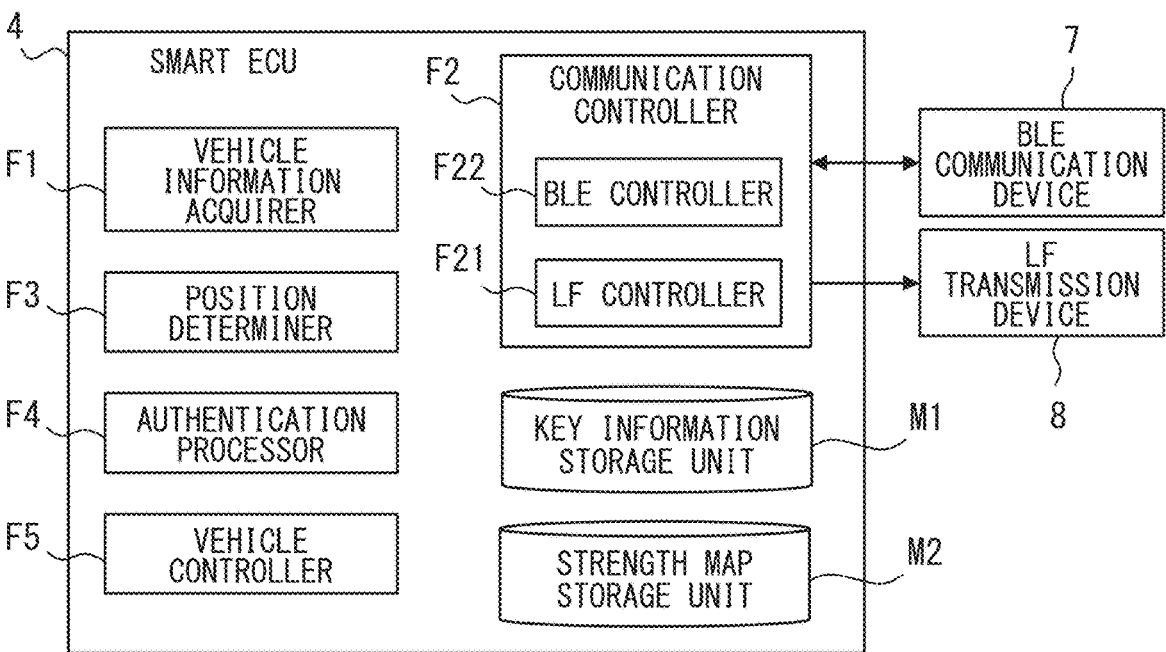
FIG. 6 is a functional block of a smart ECU.

A function and an operation of the smart ECU 4 will be described. The smart ECU 4 provides functions corresponding to various functional blocks shown in FIG. 6 by executing a program stored in the storage 43. That is, the smart ECU 4 includes a vehicle information acquirer F1, a communication controller F2, a position determiner F3, an authentication processor F4, a vehicle controller F5 as functional units. The communication controller F2 includes, as sub-functional units, an LF controller F21 and a BLE controller F22.

The smart ECU 4 also includes a key information storage unit M1 and a strength map storage unit M2. The key information storage unit M1 and the strength map storage unit M2 are implemented by using a part of a storage area of the storage 43. Either or both of the key information storage unit M1 and the strength map storage unit M2 may be realized using a non-volatile storage medium that is physically independent from the storage 43. The key information storage unit M1 and the strength map storage unit M2 allow the processor 41 to write, read, and delete data therein.

The key information storage unit M1 is a storage medium for storing information on the key device Kd that is used as an electronic key of the vehicle Hv. In the key information storage unit M1, key information for each key device Kd is stored in association with a key ID, a device ID, a user ID, and the like. The user ID is an identifier for identifying multiple users and is set for each user. The type of device indicates whether it is a smart key 2 or a mobile terminal 3. When the vehicle Hv is a service car, the smart ECU 4 may acquire in advance the device information corresponding to a user who makes a use reservation from a digital key server that issues the key information, and store the device information in the key information storage unit M1. The key information for each user or device may be stored in association with information such as an expiration date, authority, and a seat position.

The strength map storage unit M2 is a storage medium that stores a strength map indicating the LF_RSSI for each measurement point set at a predetermined interval at least within the locking-unlocking area EA. The strength map will be described in detail later.

The vehicle information acquirer F1 acquires various types of vehicle information indicating a state of the vehicle Hv and an operation of the user on the vehicle Hv from sensors, ECUs, switches, and the like mounted on the vehicle Hv. The vehicle information includes a state (on/off) of the traveling power source, an opening and closing state of each door, a locked/unlocked state of each door, a pressed state of the door button 5 and the start button 6, a shift position, and the like. An output value of a brake sensor that detects a depression amount/depression force of the brake pedal and a signal indicating an operating state of a parking brake may also correspond to the vehicle information. Acquiring the electric signals from the door button 5 and the start button 6 corresponds to detecting user operations on these buttons. In one aspect, the vehicle information acquirer F1 corresponds to a configuration that detects an operation of the user on the vehicle Hv, such as pressing of the door button 5, opening and closing of the door, or pressing of the start button 6.

The vehicle information acquirer F1 acquires a current state of the vehicle Hv based on the various types of information described above. The vehicle information acquirer F1 determines that the vehicle Hv is parked when the traveling power source is off and all the doors are locked. A condition for determining that the vehicle Hv is parked may be appropriately designed, and various determination conditions can be applied. The "acquisition" in the present disclosure includes generation, detection, and determination by internal arithmetic based on data or the like received from another device and sensor. This is because the functional arrangement in the system can be appropriately changed.

The communication controller F2 is configured to control the operation of the BLE communication device 7 and the LF transmission device 8. A configuration for controlling the LF transmission device 8 corresponds to the LF controller F21, and a configuration for controlling the BLE communication device 7 corresponds to the BLE controller F22.

The communication controller F2 as the LF controller F21 causes LF transmission devices 8 to transmit wake signals in sequence at predetermined polling intervals while the vehicle Hv is parked. The wake signals includes at least a transmitter number as transmission source information. The polling interval is set to, for example, 200 milliseconds.

When the communication controller F2 detects a user's operation of an operating member provided on the vehicle Hv, such as the door button 5, the start button 6, the brake pedal, etc., it may transmit the wake signal from the LF transmission device 8 corresponding to the operated member. The communication controller F2 may cause the LF transmission device 8b to transmit the wake signal in response to pressing of the door button 5 provided on the left door. In the present disclosure, transmitting the wake signal based on detection of a user operation on the door button 5, the start button 6, etc. is also referred to as trigger transmission. The communication controller F2 may stop/suspend the transmission of the LF signal when connected to the smart key 2 via BLE communication.

The communication controller F2 as the BLE controller F22 performs data communication with the key device Kd using the BLE communication device 7. The communication controller F2 generates data addressed to the key device Kd in the connection communication and outputs the data to the BLE communication device 7. Accordingly, the communication controller F2 causes the signal corresponding to desired data to be transmitted as radio waves. The communication controller F2 receives data from the key device Kd received by the BLE communication device 7. In the present embodiment, as a more preferable mode, data communication between the smart ECU 4 and the key device Kd is encrypted.

The communication controller F2 recognizes that the user is present in a vicinity of the vehicle Hv based on receiving a BLE signal transmitted from the key device Kd. That is, the BLE communication device 7 detects the key device Kd present around the vehicle by a passive scan method. The in-vehicle system 1 may search for the key device Kd by an active scan method involving transmission of a scan request. The two types of scan methods may be used depending on the scene. The passive scan method may be adopted in a standby scene during parking, and the active scan method may be adopted when a predetermined collation event such as pressing of the door button 5 occurs.

The communication controller F2 acquires the device ID of the key device Kd being in the communication connection from the BLE communication device 7. The smart ECU 4 specifies the user present around the vehicle Hv based on the received device ID. The communication controller F2 determines whether the device type of the communication partner corresponds to the smart key 2 based on the device ID.

The communication controller F2 acquires from the BLE communication device 7 the reception condition of the signal from the key device Kd and the distance correspondence value. The communication controller F2 acquires the reception strength and the transmission and reception phase difference for each frequency as data indicating the reception condition of the signal from the key device Kd. The communication controller F2 also provides data indicating the reception condition and the distance correspondence value of the signal from the key device Kd in each BLE communication device 7 to other function and circuit modules such as the position determiner F3.

The position determiner F3 is configured to determine a position of the key device Kd relative to the vehicle Hv based on the distance correspondence value observed by the BLE communication device 7. The position determiner F3 determines whether the key device Kd is located in the locking-unlocking area EA, an indoor area, or another area, based on the communication status with the key device Kd.

The locking-unlocking area EA is an area for the in-vehicle system 1 to execute predetermined vehicle control such as locking or unlocking of a door based on the presence of the key device Kd in the area. The locking-unlocking area EA is a type of cabin-outside working area and can also be referred to as a passive entry area. A range within a predetermined working distance from a outer door handle provided at each of a driver's seat door, a front passenger's seat door, and the trunk door may be set as the locking-unlocking area EA. The working distance that defines a size of the locking-unlocking area EA is, for example, 1.5 meters. Of course, the working distance may be 1 m or 0.7 m. The working distance is set to be smaller than 2 m for security purposes. In the present disclosure, an area to the right of the locking-unlocking area EA will also be referred to as a right-side area EA_A, an area to the left of the locking-unlocking area EA will also be referred to as a left-side area EA_B, and an area to the rear of the locking-unlocking area EA will also be referred to as the rear area EA_C.

The interior area corresponds to an area inside the vehicle compartment. The interior area may be divided into a start-permission area and a start-prohibited area that are set based on the driver's seat. The start-permission area is an area for the in-vehicle system 1 performs vehicle control of switching the traveling power source from off to on based on the presence of the key device Kd in the area. The start-permission area is a part of the vehicle compartment that is within 0.5 m of, for example, shift lever or the start button 6. The start-prohibited area is a part of the vehicle compartment other than the start-permission area. The interior area may be divided into a front seat area and a rear seat area. The start-permission area may be called a passive start area.

The other area is an area outside the vehicle compartment that corresponds to the outside of the locking-unlocking area EA. The other area may be divided into a far area and an intermediate area. The far area is an area that is 6 m or more away from the vehicle Hv. The intermediate area is within 6 m of the vehicle Hv and is an area outside the vehicle compartment other than the locking-unlocking area EA.

The position determiner F3 regards the key device Kd that is not connected for communication as being in the other area. In addition, when the position determiner F3 determines that the communicatively connected key device Kd is not present in either the interior area or the locking-unlocking area EA, it determines that the key device Kd is present in another area. The locking-unlocking area EA and the interior area correspond to a target area. In addition, the target area of the present disclosure may be either the locking-unlocking area EA or the interior area.

When determining the device location, the position determiner F3 applies different location determination algorithms depending on whether the communication partner is a smart key 2 or a mobile terminal 3. When the communication partner is the smart key 2, the position determiner F3 determines the position of the smart key 2 by using both the distance correspondence value and the LF_RSSI, as described separately below. On the other hand, when the communication partner is a mobile terminal 3, the position determiner F3 makes a determination based on the distance correspondence value and BLE_RSSI without using LF_RSSI.

Note that the position determiner F3 can have a function of calculating a device distance, which is the distance from the BLE communication device 7 to the communication partner, based on the observed distance correspondence value, as a sub-function related to determining the device position. The device distance corresponds to a parameter obtained by converting the two-frequency phase difference or the RTT into a distance dimension. The device distance is a one-way distance. Alternatively, the device distance may be a round trip distance. The BLE communication device 7 may have a function for converting the distance correspondence value into a device distance. The device distance calculated based on the distance correspondence value can also be considered as a type of measured distance value. A position determination method of the smart key 2 will be described separately later.

The authentication processor F4 cooperates with the BLE communication device 7 to perform a process of confirming or authenticating that a communication partner is the key device Kd. Communication for authentication is encrypted. The authentication process itself may be performed by use of various methods such as a challenge-response method. The authentication processor F4 transmits a predetermined/ randomly generated challenge code to the key device Kd. The challenge code includes a verification code generated by a predetermined procedure using key information corresponding to a device ID or a key ID of the communication partner. Then, a response code returned from the communication partner is collated with the verification code, and it is determined that the authentication is successful based on a fact that the response code and the verification code coincide with each other. Such an authentication process is accompanied by a process of collating the response code generated by the key device Kd based on the key information with the verification code held or dynamically generated by the smart ECU 4. The successful authentication of the key device Kd corresponds to determining that the person who attempts to access the vehicle Hv is an authorized user.

A timing at which the authentication processor F4 performs the authentication process may be, for example, a timing at which the communication connection between the BLE communication device 7 and the key device Kd is established. The authentication processor F4 may be configured to perform the authentication process at a predetermined cycle while the BLE communication device 7 and the key device Kd are connected by communication. The communication for the authentication process may be configured to be performed by using a predetermined user operation on the vehicle Hv as a trigger, such as when the start button 6 is pressed by the user or when the door is opened or closed.

The vehicle controller F5 is configured to execute the vehicle control according to the position of the key device Kd (in other words, the user) and a state of the vehicle Hv in cooperation with the body ECU 12 under a condition that the authentication of the key device Kd by the authentication processor F4 is successful. The vehicle controller F5 unlocks the door in cooperation with the body ECU 12 when the position determiner F3 determines that the key device Kd is present in the locking-unlocking area EA and it is detected that the door button 5 is pressed by the user. The vehicle controller F5 switches the traveling power source from off to on in cooperation with the power supply ECU 11 when the position determiner F3 determines that the key device Kd is present in the vehicle compartment and it is detected that the start button 6 is pressed by the user.

In addition, the smart ECU 4 registers, deletes, and disables the key device Kd based on an input signal from the input device 14. The processor 41 registers and deletes the key device Kd based on a user operation. When registering a key device, the smart ECU 4 obtains the type of the device to be newly registered by an operation signal input from the input device 14. The type information of the key device Kd acquired by the smart ECU 4 is stored in the key information storage unit M1 in association with the key information. The smart key 2 can be registered as a key device Kd at a dealer shop or the like.

The smart ECU 4 described above can perform map generation process, vehicle control process, position determination process, and the like, as described below.

\<Strength Map\>

Figures 7, 8:
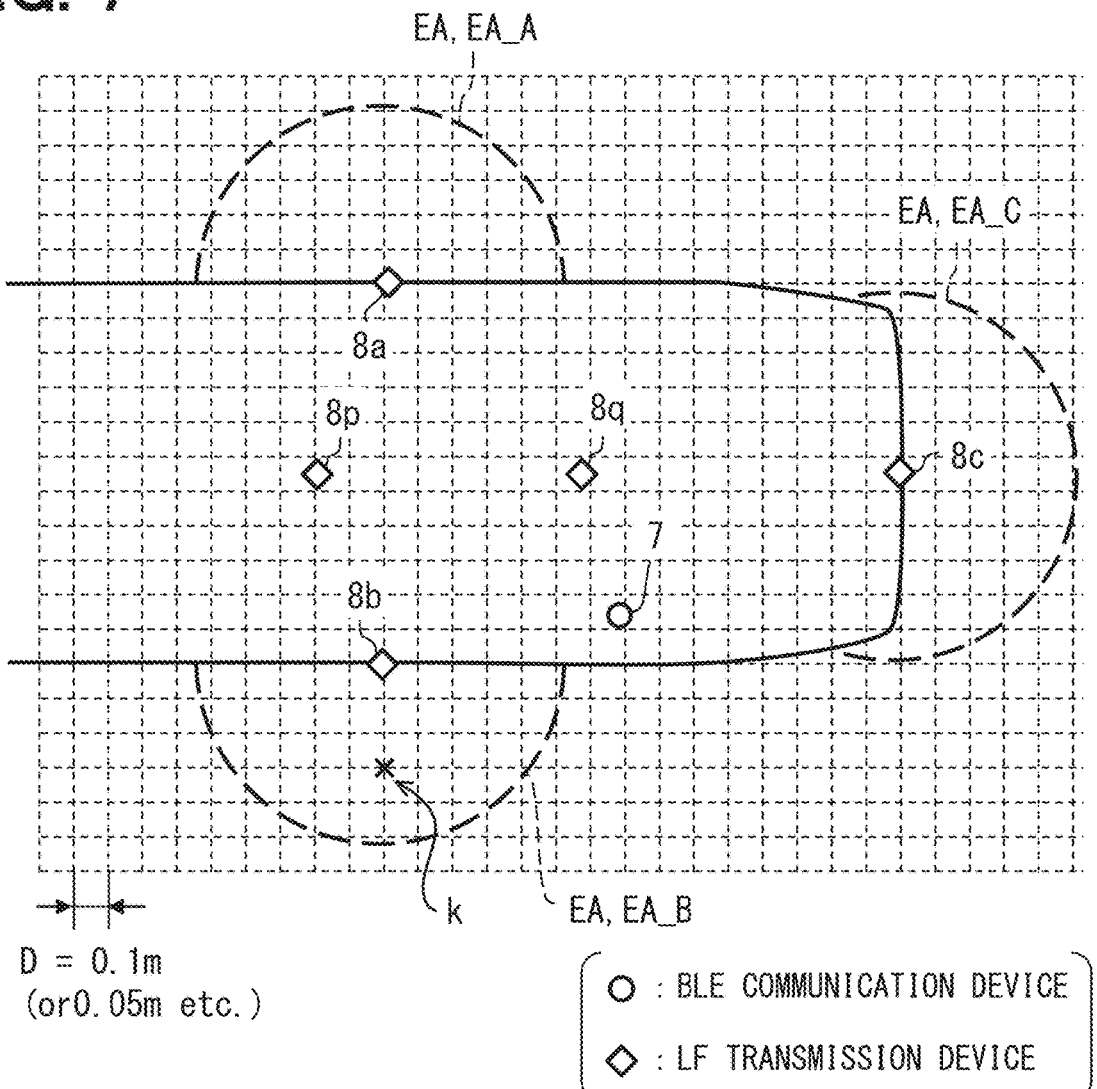
FIG. 7 is a diagram for explaining a strength map.
FIG. 8 is a schematic diagram illustrating an example of the strength map.

The strength map stored in the strength map storage unit M2 indicates the LF_RSSI for each relative measurement point determined with the vehicle Hv as the reference. The measurement points are arranged in a three-dimensional grid at predetermined intervals within a range of 2 m from the vehicle Hv. The measurement points can be arranged at intervals of, for example, 5 cm or 10 cm in a front-rear direction and a left-right direction as shown in FIG. 7. The arrangement interval D of the measurement points may be another value, such as 20 cm. The measurement points can also be arranged at predetermined intervals in a up-down direction. The measurement points may be set only within the locking-unlocking area EA or the vehicle compartment. The strength map storage unit M2 may store data in which the LF_RSSI is mapped for each point in the locking-unlocking area EA or in the vehicle compartment.

In the present embodiment, as an example, the strength map includes a data set of observable device distances and LF strength ranges for each measurement point, as shown in FIG. 8. Each measurement point is identified by a measurement number or coordinates. Data on the device distance for a certain point may not be a pinpoint value, but may have a certain range, such as the observed value±0.1 m, taking into account distance measurement errors. The LF strength range data for a certain measurement point indicates a range of LF_RSSI observed at the smart key 2 when the smart key 2 is present at the measurement point. The LF strength range data is prepared for each LF transmission device 8 that is a transmission source.

The LF strength range data for each transmission source for the locking-unlocking area EA and the interior area can also be referred to as strength condition data indicating the LF_RSSI conditions that permit system operation for each device distance. The strength map corresponds to the determination data. The strength map storage unit M2 corresponds to a determination data storage unit. Alternatively, the strength map may be a data set indicating the correspondence between distance correspondence values such as RTT or two-frequency phase difference and the LF strength range for each source, instead of/in parallel with the device distance.

When the strength map includes data on types of areas, the strength map may include information indicating the type of area to which the corresponding point belongs. The area type may be expressed by a number. For example, "1B" shown in FIG. 8 indicates the left side area EA_B. Additionally, the right side area EA_A may be expressed as "1B", the rear area EA_C as "1C", the interior area as "2", other areas as "0". According to a configuration in which the strength map includes area type information for each measurement point, it may be possible to quickly identify which area the identified device position falls into.

The point number "100001" shown in FIG. 8 indicates the measurement point k shown in FIG. 7. A word "ANT" in FIG. 8 is an abbreviation for antenna, and in the present disclosure refers to an LF transmission device or an LF antenna. A word "ANT.A" indicates the LF transmission device 8a, and "ANT.P" indicates the LF transmission device 8p. In FIG. 8, a word "<80" written in a second line of the "ANT. A" column indicates that the reception strength of the LF signal transmitted from the LF transmission device 8*a* is less than −80 dBm. A word "−10<" in the second line of the "ANT. B" column indicates that the reception strength of the LF signal transmitted from the LF transmission device 8*b* is greater than −10 dBm. A word "−50±5" indicates that the observable LF_RSSI falls within the range of −45 dBm to −55 dBm.

<Map Generation Process>

Figure 9:
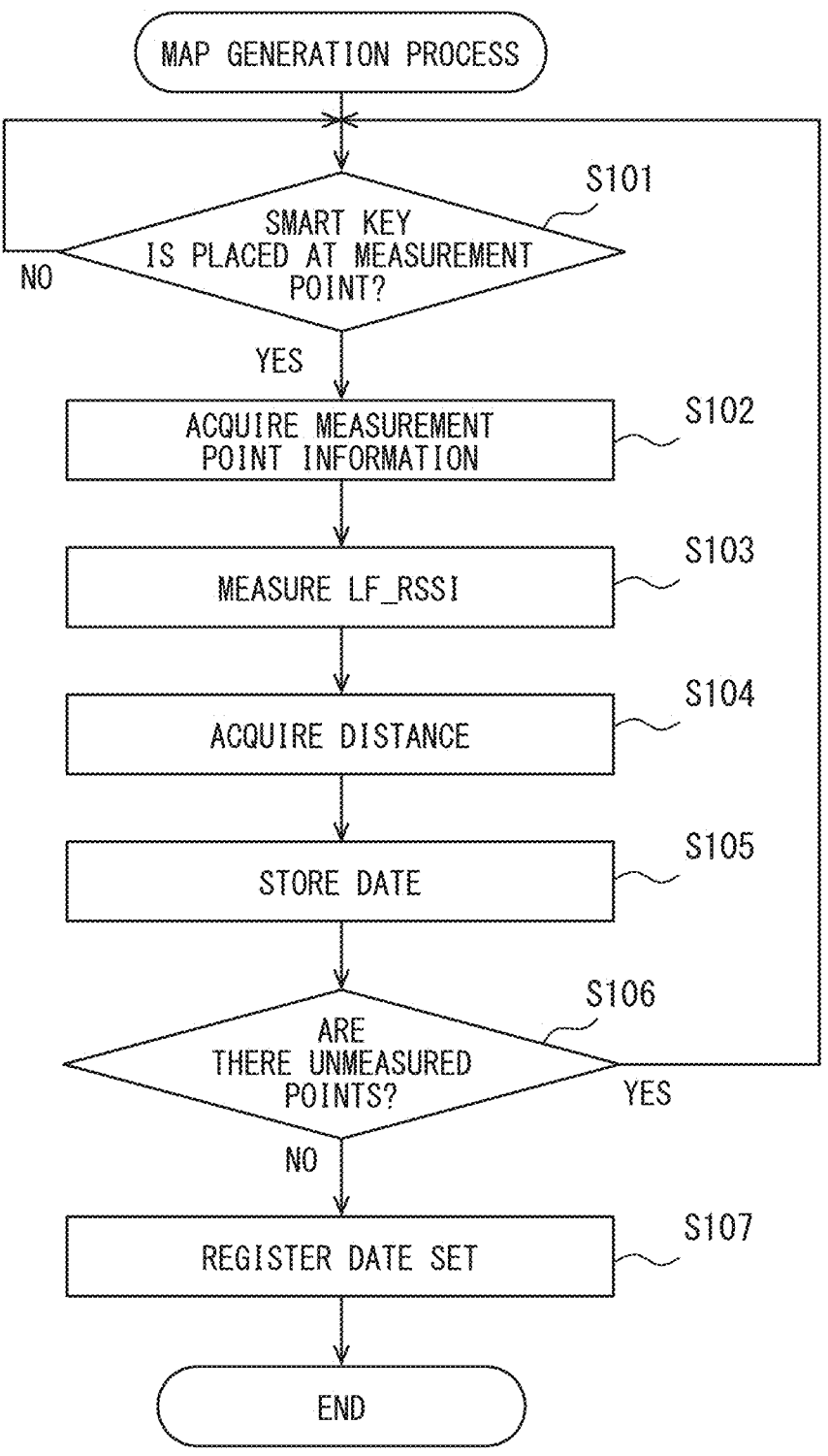
FIG. 9 is a flowchart illustrating an example of a map generation process.

Here, the map generation process performed by the smart ECU 4 in cooperation with the smart key 2 will be described with reference to the flowchart shown in FIG. 9. The map generation process is a process for generating a strength map and storing it in the strength map storage unit M2. The map generation process can be started when a staff member at a dealer shop, a factory, or the like performs a predetermined registration start operation on the input device 14. The map generation process includes steps S101 to S107 as an example.

Step S101 is a step for determining whether the smart key 2 is placed at a given measurement point. The processor 41 detects that the smart key 2 has been placed at an arbitrary measurement point based on an operation signal input from the input device 14 indicating that placement of the smart key 2 has been completed. When the processor 41 detects that the smart key 2 has been placed, the processor 41 executes step S102.

Step S102 is a step for acquiring information on the measurement point to be registered, such as coordinates and the measurement point number. The processor 41 also acquires information about the measurement points based on the operation of the operator/user on the input device 14. When the information on the measurement point is acquired, the processor 41 executes step S103.

Step S103 is a step of measuring LF_RSSI. Step S103 includes causing each LF transmission device 8 to transmit an LF signal (for example, a wake signal) and causing the smart key 2 to measure the LF_RSSI for each transmission source. Step S103 also includes acquiring an observed value of LF_RSSI for each transmission source from the smart key 2 through BLE communication. After establishing a BLE communication connection with the smart ECU 4, the smart key 2 may spontaneously report the LF_RSSI observation value for each transmission source, or may report the LF_RSSI observation value based on receiving a transmission request from the smart ECU 4.

In step S103, the processor 41 generates LF strength range data for each transmission source at the measurement point. The LF_RSSI measurement for each transmission source may be performed multiple times. The processor 41 may generate the LF strength range data for each transmission source by performing statistical processing (for example, averaging) on the results of multiple measurements. When the generation of the LF strength range data for each transmission source is completed, the processor 41 executes step S104.

In step S104, the BLE communication device 7 performs distance measurement communication to acquire the distance from the BLE communication device 7 to the measurement point. The processor 41 acquires the device distance based on the RTT and the two-frequency phase difference obtained by having the BLE communication device 7 perform the distance measurement communication. The distance value obtained here is a value observed during actual communication. A propagation path of a wireless signal can be longer than a straight-line distance due to wraparound. By adopting the distance value observed by actually carrying out communication, rather than a simple straight-line distance from the installation position of the BLE communication device 7 to the target measurement point, as the distance information to be linked to the LF strength range data, it is possible to reduce a risk of misjudging the device position. When the registration of the distance information is completed, the processor 41 executes step S105.

In step S105, the LF strength range data for each transmission source observed in step S103 and the observed value of the device distance acquired in step S104 are temporarily stored in the RAM 42 in association with the number/coordinates of the measurement point. The processor 41 also sets the value of the area type based on the number/coordinates of the measurement point. When the association of each piece of data for the measurement point to be registered is completed, the processor 41 executes step S106.

Step S106 is a step for determining whether there remains any measurement point where the LF_RSSI or the like has not yet been measured. If there are any unmeasured points remaining, the process from step S101 onwards is executed for any one of the unmeasured points. On the other hand, when distance information and LF strength range data for all measurement points have been obtained, proceed to step S107, and a data set packaging the data for each measurement point is registered in the strength map storage unit M2 as strength map data, and the process terminates.

The map generation process may be performed for each vehicle Hv, or may be performed only for a specific vehicle. The strength map storage unit M2 of a certain vehicle Hv may store strength map data generated in another vehicle. Common strength map data may be stored in smart ECUs 4 used in the same vehicle model.

<Vehicle Control Process>

Figure 10:
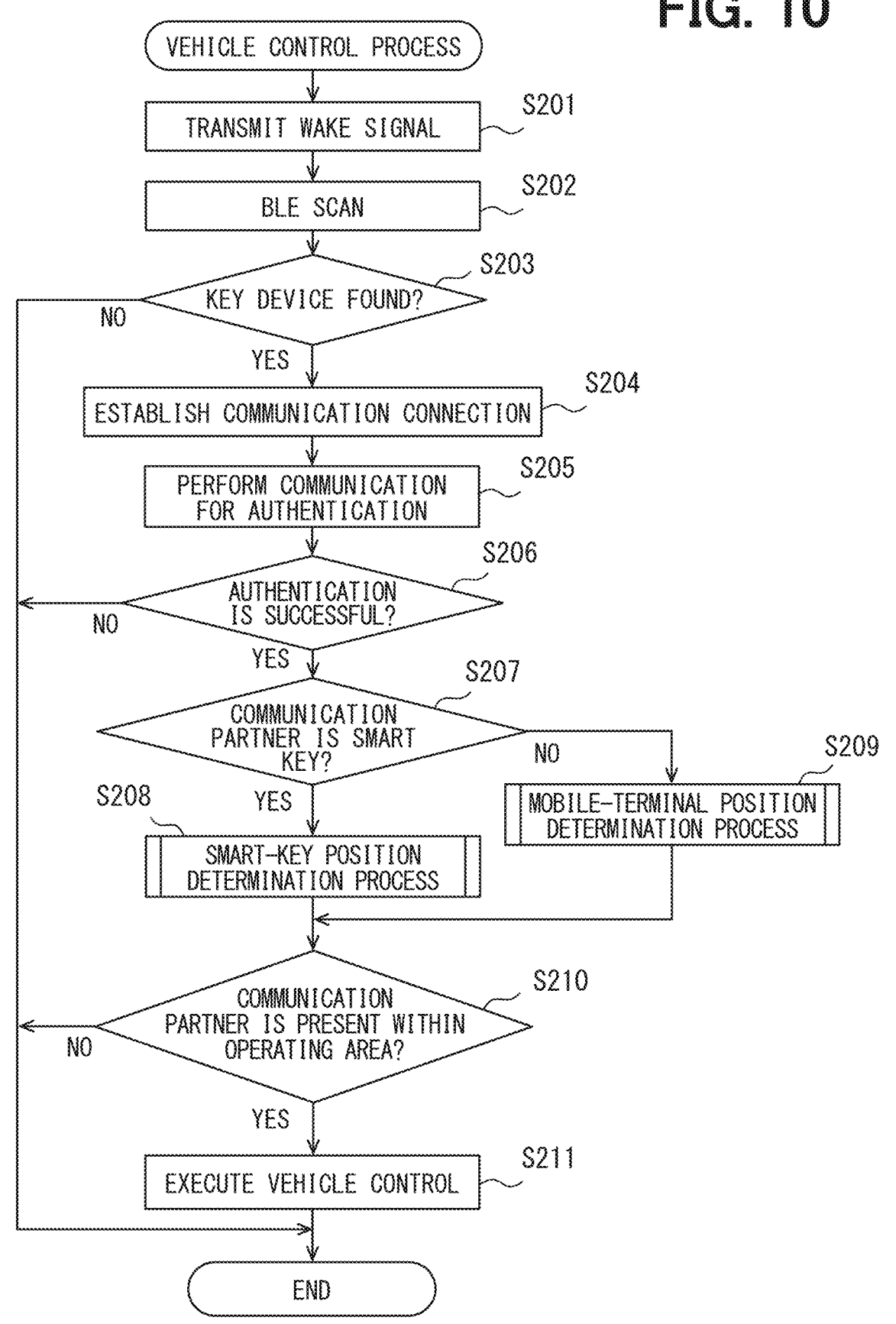
FIG. 10 is a flowchart illustrating an example of a vehicle control process.

Here, the vehicle control process performed by the smart ECU 4 will be described with reference to a flowchart illustrated in FIG. 10. The vehicle control process is a process for performing vehicle control such as unlocking or locking the doors and switching on/off the traveling power source depending on the position of the smart key 2 or the mobile terminal 3. The vehicle control process is executed at a predetermined cycle, such as every 200 milliseconds, while the traveling power source is off. The vehicle control process may be executed in response to a trigger such as detection of a user operation on the vehicle Hv, such as pressing the door button 5, pressing the start button 6, opening or closing a door, or pressing the brake pedal. The vehicle control process includes steps S201 to S211 as an example.

Step S201 is a step of causing each LF transmission device 8 to transmit a wake signal in a predetermined order. When step S201 is completed, the processor 41 executes step S202.

Step S202 is a step for searching for (so-called scanning) the key device Kd. When the scanning in step S202 does not detect any key device Kd (S203 NO), the process from step S204 onwards is omitted and the process terminates. When the key device Kd is found as a result of the scanning in step S202, the processor 41 executes step S204.

Step S204 is a step for causing the BLE communication device 7 to establish a communication connection with the key device Kd detected by the scanning in step S202. A communication connection is established by sending a connection request and exchanging a response thereto. The processor 41 identifies the communication partner based on the source information contained in the advertisement signal or the like. The detailed sequence from scanning to communication connection and the start of encrypted communication can be performed in accordance with the BLE standard. When the communication connection with the key device Kd is completed, the processor 41 executes step S205.

Step S205 is a step for executing communication to authenticate the wireless communication partner. The processor 41 performs the authentication process for the key device Kd using the challenge code and the key information of the communication partner stored in the key information storage unit M1. When the authentication is successful (S206 YES), the processor 41 executes step S207. On the other hand, when the wireless authentication fails (S206 NO), the process terminates.

Step S207 is a step for determining whether the communication partner is the smart key 2. The processor 41 determines whether the communication partner is a smart key 2 by comparing the device ID of the communication partner with the device type information for each device ID stored in the key information storage unit M1. As another aspect, the processor 41 may determine whether the communication partner is a smart key 2 by acquiring a device type code or an included function code, which will be described later, from the communication partner via BLE communication. When it is determined that the communication partner is the smart key 2 (S207 YES), the processor 41 executes step S208. When it is determined that the communication partner is not the smart key 2 (S207 NO), the processor 41 executes step S209.

Step S208 is a step for carrying out a smart-key position determination process. The smart-key position determination process will be described separately later. By executing the smart-key position determination process, the processor 41 determines whether the smart key 2 as the communication partner is located in the locking-unlocking area EA, the interior area, or another area. When step S208 is completed, the processor 41 executes step S210.

Step S209 is a step for carrying out a mobile-terminal position determination process. The mobile-terminal position determination process will also be described separately below. By executing the mobile-terminal position determination process, the processor 41 determines whether the mobile terminal 3 as the communication partner is located in the locking-unlocking area EA, the interior area, or another area. When step S209 is completed, the processor 41 executes step S210.

In step S210, based on the result of the process in step S208 or S209, it is determined whether the key device Kd as the communication partner is present within an operating area. The operational area refers to an area in which the vehicle control such as unlocking can be performed. More specifically, the locking-unlocking area EA and the interior area correspond to the operating area. Other areas are not included in the operating area. In addition, when a welcome area, which is an exterior area where exterior lighting equipment is turned on when a user approaches, is set in the smart ECU 4, the welcome area may also be included in the operation area. Furthermore, when a remote parking area, which is an outside area where the vehicle Hv can be parked semi-automatically by remote control, is set in the smart ECU 4, the remote parking area may also be included in the operation area. The welcome area and the remote parking area are set up within 6 m of the vehicle Hv.

When the processor 41 determines that the key device Kd is present within the operating area (S210 YES), the processor 41 executes the vehicle control according to the device position (S211). On the other hand, when the processor 41 does not determine that the key device Kd is present within the operating area (S210 NO), the process terminates.

Note that step S211 may be a step of transitioning to a standby state in which the vehicle control can be executed in response to a user operation on a predetermined operating member, rather than executing the vehicle control such as unlocking. The standby state corresponds to a state in which the vehicle waits for a user operation on an operating member, such as the door button 5, that corresponds to the content of the vehicle control. When the processor 41 detects a specific user operation in the standby state, the processor 41 promptly executes the vehicle control corresponding to the operating member or the device position.

<Position Determination Process for Smart Keys>

Figure 11:
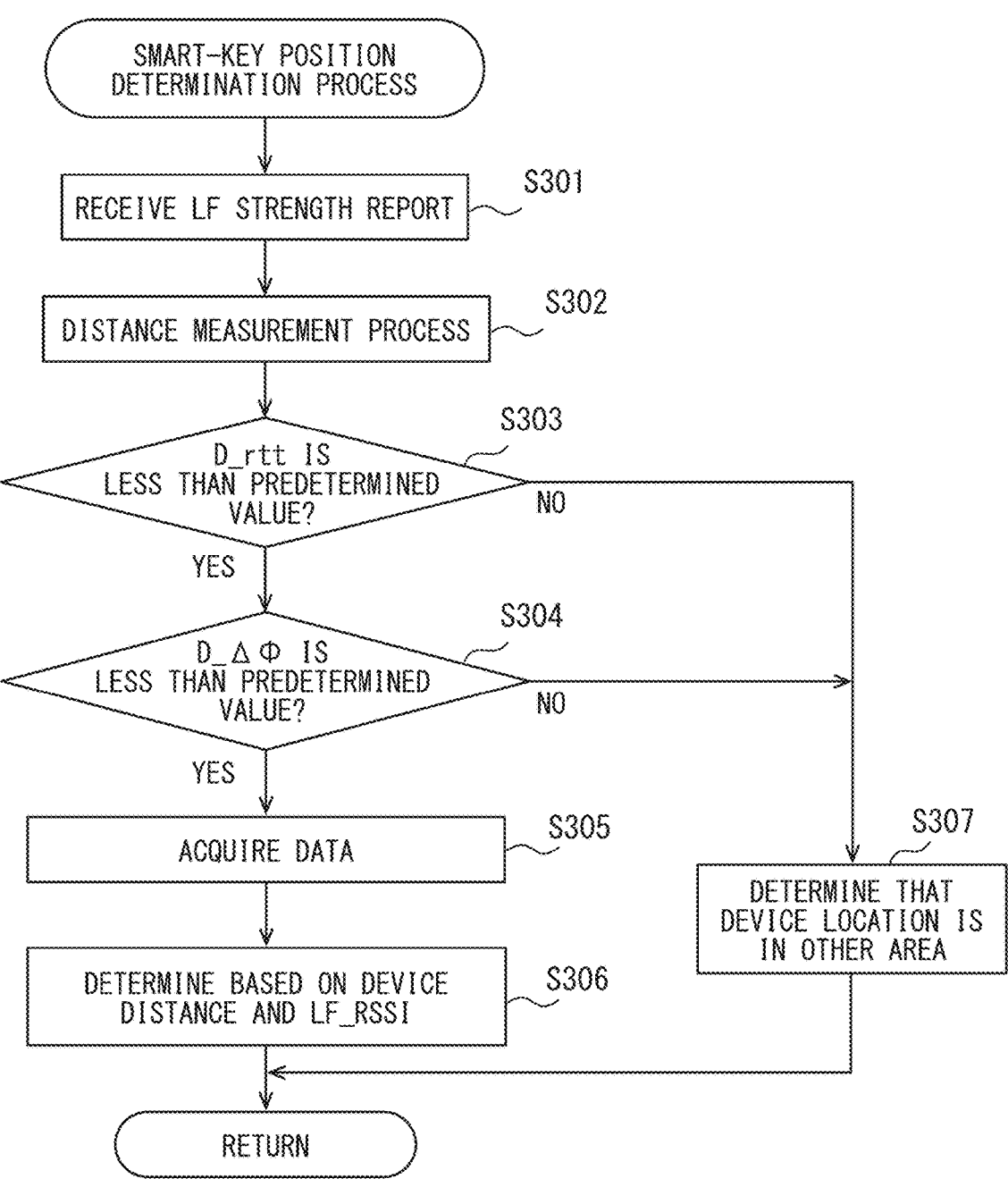
FIG. 11 is a flowchart illustrating an example of a position determination process when a communication partner is a smart key.

Here, the position determination process will be described when the communication partner is identified as the smart key 2. The smart-key position determination process includes steps S301 to S307 as shown in FIG. 11. The flowchart shown in FIG. 11 is executed as step S208 in FIG. 10.

Step S301 is a step of receiving an LF strength report, which is a data set/message indicating the LF_RSSI for each transmission source, from the smart key 2. The LF strength report itself is transmitted and received via BLE communication. The LF_RSSI for each transmission source reported here is a strength observation value for the wake signal transmitted in step S201. In addition, as another aspect, step S301 may include a step of transmitting an LF signal for LF strength measurement from each LF transmission device 8. In this case, step S301 corresponds to a step of acquiring an observed value of the reception strength of the LF signal transmitted from each LF transmission device 8 for LF strength measurement. When the reception of the LF strength report is completed, the processor 41 executes step S302.

Step S302 is a step for carrying out the distance measurement process, similar to step S104. That is, the processor 41 acquires the RTT and the two-frequency phase difference by having the BLE communication device 7 perform the distance measurement communication. The processor 41 also generates, as the device distance, an RTT measured distance value, which is a calculated value of the distance based on the observed RTT, and a phase difference measured distance value, which is a calculated value of the distance based on the observed two-frequency phase difference.

In FIG. 11, a word "D_rtt" indicates the RTT measured distance value, and a word "D_Δφ" indicates the phase difference measured distance value. The combination of frequencies for the distance measurement, which are the frequencies used to calculate the two-frequency phase difference, may be set in advance or may be dynamically determined. The frequency for distance may be a frequency for advertising or a frequency for data communication. In BLE communication, frequency hopping is performed after a connection is established. The processor 41 may obtain the transmission and reception phase difference at the current frequency each time the frequency is switched. The current frequency is the frequency that is currently in use. The processor 41 may dynamically select a combination of frequencies for the distance in which the difference frequency Δf, which is the difference between the frequencies, is equal to or greater than 10 MHz and less than 70 MHz, to perform phase difference distance. The processor 41 may calculate the phase difference measured distance value for a combination of multiple frequencies. A phase difference measured distance value may be calculated for each combination of frequencies having a population of four or more frequencies, and a final phase difference measured distance value may be determined by combining these. When the distance measurement process in step S302 is completed, the processor 41 executes step S303.

Step S303 is a step for determining whether the RTT measured distance value (D_rtt) is less than a predetermined value. The predetermined value here is set to 6 m, 10 m, 15 m, etc. When the RTT measured distance value is less than the predetermined value, the processor 41 performs step S304. On the other hand, when the RTT measured distance value is equal to or greater than the predetermined value, the processor 41 executes step S307. The RTT measured distance value is proportional to the RTT. Step S303 corresponds to a step of determining whether the observed value of the RTT is less than a predetermined value.

In addition, since the signals exchanged in BLE communication are longer than the pulse signals used in UWB-IR, the RTT observable in BLE communication is less accurate than the RTT observable in UWB communication. Furthermore, the accuracy of the distance using RTT in BLE communication is not as high as the distance using two-frequency phase difference. The RTT measured distance value in BLE communication may contain an error of about several meters. The threshold value used in step S303 is preferably set to be approximately 1 to 2 m greater than the expected maximum distance, which is the distance from the installation position of the BLE communication device 7 to a farthest point of the locking-unlocking area EA. Step S303 corresponds to a primary filter that distinguishes whether the smart key 2 is possibly present in the locking-unlocking area EA or in the vehicle compartment based on the RTT measured distance value.

In step S304, it is determined whether the phase difference measured distance value (D_Δφ) is less than a predetermined value. The predetermined value here may be set to an expected maximum distance, such as 5 m. Step S304 corresponds to a secondary filter that distinguishes whether the smart key 2 is likely to be present in the locking-unlocking area EA or the interior area based on the phase difference measured distance value. When the phase difference measured distance value is less than the predetermined value, the processor 41 performs step S305. On the other hand, when the phase difference measured distance value is equal to or greater than the predetermined value, the processor 41 executes step S307.

Step S305 is a step of referring to the strength map and acquiring data of the measurement point corresponding to the device distance acquired in the above process. When there are multiple measurement points corresponding to the device distance, the data for all of them is extracted. Step S305 corresponds to a step of acquiring data of a measurement point linked to the observed device distance from the strength map data, using the device distance as a search key. The measurement point data includes LF strength range data for each LF antenna. Of the RTT measured distance value and the phase difference measured distance value, the processor 41 adopts the phase difference measured distance value as the device distance. In another aspect, the processor 41 may adopt the RTT measured distance value as the device distance. The processor 41 may also use an average or weighted average of the RTT measured distance value and the phase difference measured distance value as the device distance.

In step S306, the location of the smart key 2 is determined based on the currently observed device distance, a combination of the LF_RSSI for each transmission source, and the strength map. More specifically, the processor 41 compares the LF_RSSI observation values for each source acquired in step S301 with the LF strength range data for each measurement point read out in step S305, and determines whether there is a measurement point that matches the combination of observation values.

When there is no measurement point/data set in the strength map that matches the current observation, the device location is determined to be unknown. Furthermore, when a measurement point that matches the current observation result is present in the strength map, it is determined that the smart key 2 is present at that measurement point. When there is no measurement point in the strength map that matches the current observation result, the measurement point that is most similar to the current observation result may be determined as the device position. Furthermore, when there are multiple measurement points in the strength map that match the current observation result, the measurement point that is most similar to the current observation result may be determined as the device position.

The processor 41 determines whether the smart key 2 is located in the locking-unlocking area EA, the interior area, or another area based on the coordinates or the area type linked to the device position determined in the strength map by the above process. In addition, determining whether the smart key 2 is present in the locking-unlocking area EA based on the reception conditions of the signal from the smart key 2 corresponds to determining whether the reception conditions of the signal from the smart key 2 satisfies specified conditions for regarding the smart key 2 as being present in the locking-unlocking area EA. The same can be said for determining other areas, such as the interior area. The same can be said about the mobile terminal 3.

Step S307 is a step for determining that the device location is in the other area. Step S307 may be a step of determining that the device location is unknown. When the processor 41 determines that the device location is unknown, it may consider that the key device Kd is located in another area. The determination result of the device location can be managed, for example, by an area flag. As an example here, when the location of the smart key 2 is determined to be in the other area/unknown, the area flag is set to 0. In addition, a state in which the smart key 2 is determined to be present in the locking-unlocking area EA is represented by area flag=1, and a state in which the smart key 2 is determined to be present in the interior area may be represented by area flag=2. The area flag corresponds to a parameter indicating the result of determination of the area to which the smart key 2 belongs, in other words, the result of determination of the device location. The area flag can be called an area code. The values of the flags (codes) indicating various determination results may be changed as appropriate.

<Position Determination Process for Mobile Terminals>

Figure 12:
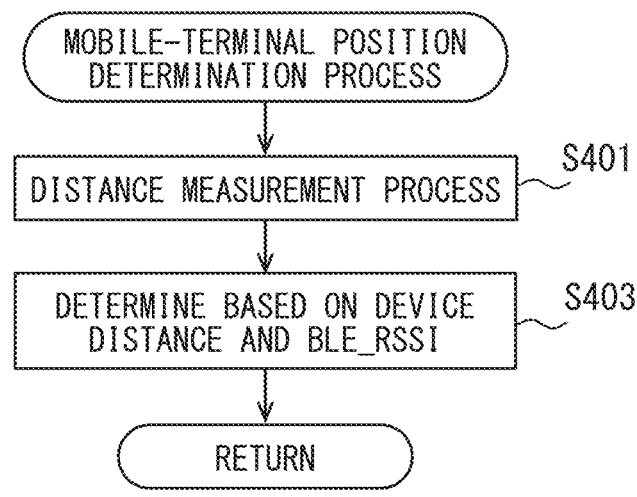
FIG. 12 is a flowchart illustrating an example of a position determination process when the communication partner is a mobile terminal.

The mobile-terminal position determination process includes steps S401 to S402 as shown in FIG. 12. The flowchart shown in FIG. 12 is executed as step S209 in FIG. 10.

Step S401 is a step for carrying out the distance measurement process, similar to step S302. By executing step S302, the processor 41 obtains the RTT measured distance value and the phase difference measured distance value for at least one combination of frequencies, and determines the device distance based on them. In addition, the processor 41 acquires the reception strength (BLE_RSSI) of the signal from the mobile terminal 3 from the BLE communication device 7.

Step S402 is a step of determining the device position based on the combination of the reception strength and the device distance acquired in step S401. The processor 41 determines that the device is present in the interior area when the BLE_RSSI is greater than or equal to a predetermined first strength threshold and the device distance is less than a first distance. The first distance can be set to a value such as 0.5 m added to the distance from the left C-pillar to the steering wheel where the BLE communication device 7 is mounted.

In addition, the processor 41 determines that the device is located in the left area EA_B when the BLE_RSSI is less than a predetermined second strength threshold and the device distance is less than a second distance. The second strength threshold can be set to a value that is a predetermined amount smaller than the first strength threshold, taking into consideration that the BLE communication device 7 is disposed on the interior side of the C-pillar. The second distance can be set to a value such as the distance from the left C-pillar to the outside door handle for the left front seat plus a predetermined value, such as 0.5 m. Furthermore, the processor 41 determines that the device is located in the right area EA_A or the rear area EA_C when the BLE_RSSI is less than a third strength threshold and the device distance is greater than the third distance and less than a fourth distance. The third strength threshold can be set to a value equal to or smaller than the second strength threshold, taking into account the presence of an obstruction such as a right door between the left C-pillar and the right area EA_A. The third distance is set to a value obtained by subtracting a predetermined value (for example, 0.5 m) from the distance from the left C-pillar to the right B-pillar. The fourth distance is set to the value obtained by adding a predetermined value (for example, 0.5 m) to the distance from the left C-pillar to the outside door handle for the right front seat. In addition, it is preferable that the processor 41 is configured not to unlock the door even if the door button 5 for the left front seat is pressed when it is determined that the mobile terminal 3 is present in the right area EA_A or the rear area EA_C.

In addition, the processor 41 determines that the mobile terminal 3 is located in another area when the combination of the observed BLE_RSSI and device distance does not satisfy the conditions for determining that the mobile terminal 3 is located in the locking-unlocking area EA or the interior area.

Effects

Forming a suitable locking-unlocking area EA based solely on device distance is difficult when the in-vehicle system 1 is equipped with only one BLE communication device 7 and the BLE communication device 7 is positioned left or right of the vehicle center, such as on the left C-pillar. Setting the area within 2 m of the BLE communication device 7 (left C-pillar) as the locking-unlocking area EA may result in a reduction or disappearance of the area that functions as the right-side area EA_A. This can potentially reduce comfort for users attempting to enter the vehicle from the right side. In addition, in order to ensure convenience for users attempting to board from the right side, if the area within 4 m of the BLE communication device 7 is set to be considered as the locking-unlocking area EA, the range on the left side of the vehicle that is considered to be the locking-unlocking area EA would become larger, which could reduce the security level.

To address such an issue, the processor 41 configured as described above determines the device position by combining the reception strength of the LF signal for each transmission source with the device distance. This enables the processor 41 to accurately determine whether the smart key 2 is present in the locking-unlocking area EA or the interior area.

Figure 13:
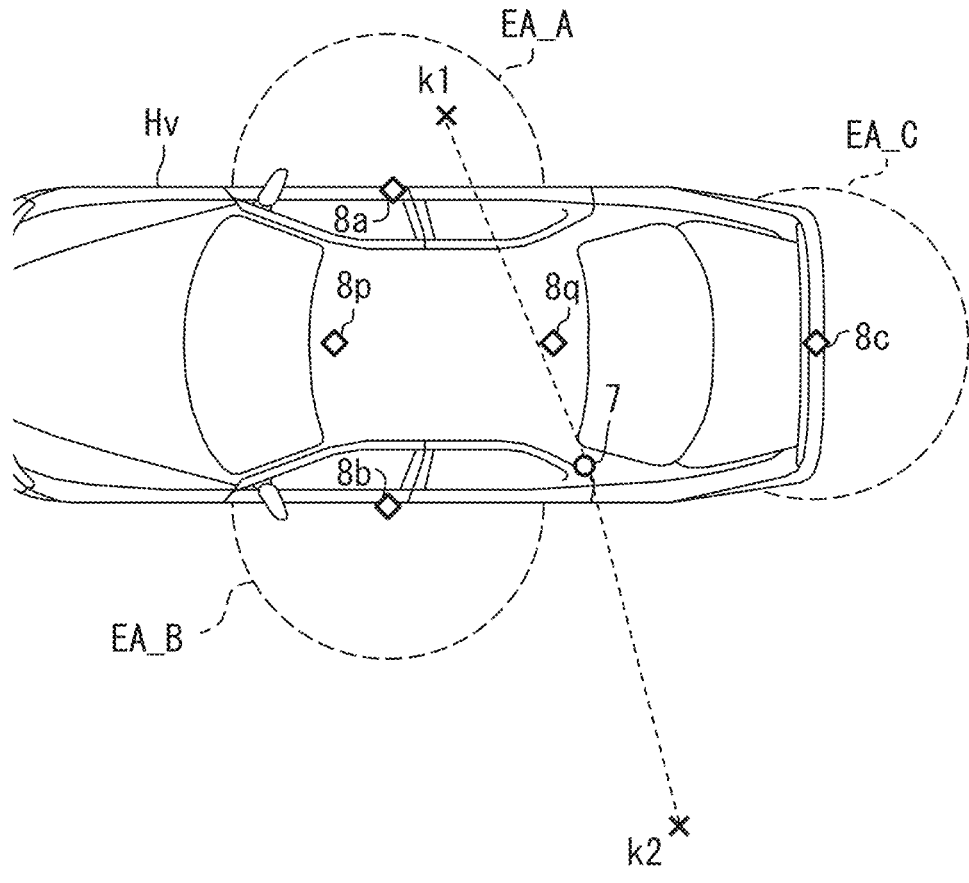
FIG. 13 is a diagram for explaining effects of determining a device position using the strength map when the communication partner is the smart key.

Specific examples are as follows. A first point k1 and a second point k2 shown in FIG. 13 are both points that are 3 meters away from the BLE communication device 7. The first point k1 is located in the right-side area, whereas the second point k2 is a point belonging to the other area on the left side of the vehicle. Since the first point k1 and the second point k2 are both at the same distance from the BLE communication device 7, the device distances themselves observed by the distance measurement communication are approximately the same. Therefore, the first point k1 and the second point k2 cannot be distinguished from each other based on the device distance alone.

However, since the relative positions of the first point k1 and the second point k2 with respect to the LF transmission devices 8 are different, the LF strength of each transmission source observed by the smart key 2 may differ significantly. At the first point k1, the LF_RSSI for the LF transmission device 8a may be large, and the LF_RSSI for the LF transmission device 8b may be small. On the other hand, at the second point k2, the LF_RSSI for the LF transmission device 8a may be small, and the LF_RSSI for the LF transmission device 8b may be large. Therefore, by combining the device distance with the reception strength of the LF signal, the risk of erroneously determining that the smart key 2 is present in the locking-unlocking area EA when it is not actually present therein can be reduced.

In addition, the processor 41 changes the algorithm used to determine the device location depending on whether the communication partner is a smart key 2. According to this configuration, an appropriate position determination algorithm can be applied according to the functions installed in the communication partner, which is expected to have effects such as improving the accuracy of position determination and omitting unnecessary processing in the processor 41. Note that changing the determination algorithm corresponds to changing the number, combination, and parameters of communication devices used for determination.

Furthermore, when the communication partner is a mobile terminal 3 with which LF communication is not possible, the processor 41 performs position determination using not only the distance measurement result from one BLE communication device 7 but also the BLE_RSSI. This configuration can improve the accuracy of determination compared to a configuration in which position determination is performed based only on device distance.

While the embodiment of the present disclosure has been described above, the present disclosure is not limited to the embodiment described above. Various modifications to be described below are also included in the technical scope of the present disclosure. Besides the modifications to be described below, the present disclosure can be implemented with various changes without departing from the gist of the present disclosure. Various supplements and/or modifications to be described below can be implemented in combination as appropriate within a scope that does not cause technical inconsistency. The members having the same functions as described above are assigned the same reference numerals, and the description of the same members will be omitted. Further, when only a part of the configuration is mentioned, the above description can be applied to the other parts.

<Additional Information on Distance Measurement Method Using Two-Frequency Phase Difference>

The value of the two-frequency phase difference makes one rotation at a difference wavelength λd, which corresponds to the difference frequency Δf. The processor 41 cannot normally distinguish between Δϕ and Δϕ+2π×N (N is an integer) when the two-frequency phase difference is Δϕ. Therefore, generally, a distance measurement method using a two-frequency phase difference can only be applied in a range where the two-frequency phase difference does not exceed 2π or 360° (that is, one period). Further, the differential wavelength λd is a parameter determined by 2π/Δf. Therefore, the measuring range based on the two-frequency phase difference may differ depending on the combination of frequencies.

For example, when a first frequency f1=2402 MHz and a second frequency f2=2480 MHz, the difference frequency Δf is 78 MHz and the differential wavelength λd is 3.85 m. Therefore, the measuring range for the above frequency combination is 3.85 meters for the round trip distance and approximately 1.93 meters for the one-way distance. With the above frequency combination, the processor 41 cannot distinguish between a case where the device distance is 0.5 meters and a case where the device distance is 0.5+1.93=2.43 meters.

The processor 41 may selects a combination of frequencies to provide a desired measuring range. If the distance at which a BLE communication connection can occur is assumed to be 20 meters, the processor 41 may perform phase difference ranging using a combination of frequencies that results in a one-way measuring range of 20 meters or more. According to this configuration, erroneous determination of the device position can be reduced due to periodicity of the phase difference. As described above, the processor 41 may determine the device distance by combining phase difference measured distance values for frequency combinations. According to this configuration, the accuracy of position determination can be improved while relaxing the restrictions on the frequencies used for the distance measurement.

Further, the processor 41 may estimate the value of the period number N described above using an RTT-based measured distance value. In other words, it may be possible to estimate whether the two-frequency phase difference corresponds to any one of N=0, 1, 2, 3, . . . based on the RTT measured distance value. The processor 41 may also determine the phase difference measured distance value based on the estimated value of the number of periods (N). According to this configuration, the phase difference ranging may be possible even in a range exceeding the difference wavelength. As described above, the RTT measured distance value may be used to determine the number of periods (N) in phase difference ranging.

<Additional Information of BLE Communication Devices Placement>

Figure 14:
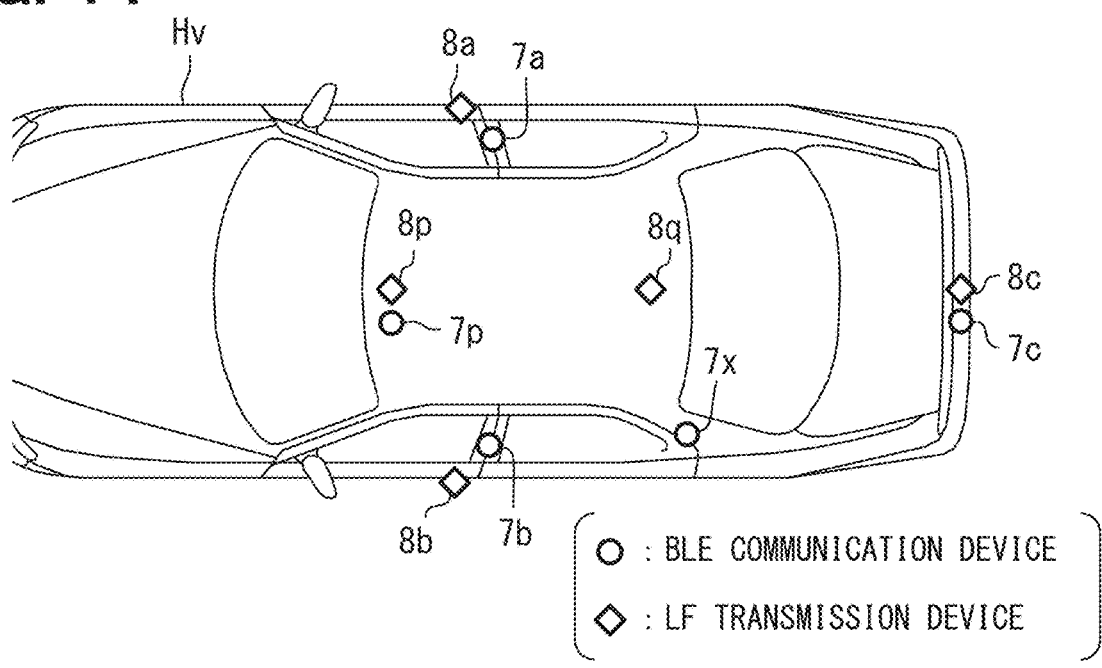
FIG. 14 is a diagram illustrating a modification of installation positions of BLE communication devices and LF transmission devices.

The in-vehicle system 1 may be equipped with multiple BLE communication devices 7. The in-vehicle system 1 may include BLE communication devices 7a, 7b, 7c, 7p, and 7x as shown in FIG. 14. The BLE communication device 7x is built in the smart ECU 4. The BLE communication device 7a is disposed on the outer surface of the right side of the vehicle Hv, and the BLE communication device 7b is disposed on the outer surface of the left side of the vehicle Hv. The BLE communication devices 7a, 7b are disposed on the outer surface of the B-pillar or on the outer door handle. The BLE communication device 7c is disposed at an arbitrary location at the rear end of the vehicle, for example, in a trunk door or in a rear bumper. The BLE communication device 7p is disposed at an arbitrary location in the vehicle compartment, such as on an instrument panel or a center console.

The B pillar provided in the vehicle Hv can be divided into a door-side B pillar provided in a door module and a vehicle-body-side B pillar serving as a column or frame including a roof portion of a vehicle body. The door-side B pillar corresponds to a portion of a front door or a rear door that is in contact with a vehicle-body-side pillar. The BLE communication devices 7a, 7b may be disposed in a portion of the door-side B-pillar adjacent to a side window, for example, in a resin portion above a lower end of the side window.

In addition, the in-vehicle system 1 may be equipped with a BLE communication device 7 arranged on the interior side of the driver's door, a BLE communication device 7 arranged on the interior side of the left B-pillar, and a BLE communication device 7 arranged in the trunk. The BLE communication device 7 may be attached in the vehicle compartment at a position that is at least 0.1 meters below a bottom edge of the side window. The in-vehicle system 1 may include a BLE communication device 7 arranged on a ceiling of the vehicle compartment.

The BLE communication device 7x is used for data communication with the key device Kd. In the present disclosure, the communication device used for data communication with the key device Kd is also referred to as a gateway communication device. The BLE communication device 7 (gateway communication device) used for data communication with the key device Kd can also be called a representative device, a central device, and a data communication device. The BLE communication device 7 as a gateway communication device may be used not only for data communication but also for observing the RTT and the transmission and reception phase difference.

The processor 41 uses the BLE communication device 7 other than the BLE communication device 7x as a communication device for determining the device position. The BLE communication device 7 for position determination is also referred to as a distance measuring device in the present disclosure. The distance measuring device corresponds to a communication device for observing the RTT, the transmission and reception phase difference, and the reception strength. In one aspect, the distance measuring device may correspond to a communication device that does not communicate data with the key device Kd. In an example shown in FIG. 14, the BLE communication devices 7a, 7b, 7c, 7p correspond to distance measuring devices. The device measuring device can also be called an observation device or a satellite communication device. Alternatively, the smart ECU 4 may cause each of the multiple BLE communication devices 7 to perform data communication with the key device Kd.

When the in-vehicle system 1 includes BLE communication devices 7, the processor 41 first performs authentication and identification of the communication partner using the BLE communication device 7 as a gateway communication device. If the processor 41 determines that the communication partner is the smart key 2 (FIG. 15 S501 YES), it determines the device location based on a combination of observed values such as RTT at the BLE communication device 7 and LF_RSSI for each transmission source (S502). In addition, when the in-vehicle system 1 includes the BLE communication devices 7, the processor 41 may cause a BLE communication device 7 other than the BLE communication device 7x to perform distance measurement communication with the smart key 2.

On the other hand, if the processor 41 determines that the communication partner is not the smart key 2 (S501 NO), it activates the BLE communication device 7 as a distance measuring device (S503). Then, the device position is determined based on the device distances and reception strengths from the multiple BLE communication devices 7 (S504). In this way, the processor 41 may change the number and type of communication devices used to determine the device location depending on whether the communication partner is a smart key 2. The distance measuring device may be set in an inactive state in order to save power until the gateway communication device is connected to the key device Kd.

According to the above configuration, when the communication partner is the smart key 2, there is no need to operate multiple distance measuring devices, so the processor 41 can reduce the frequency of activating the BLE communication device 7. In addition, when the communication partner is a mobile terminal 3, the measured distance values/reception strengths of multiple BLE communication devices 7 are used to determine the device position, making it possible to improve the accuracy of estimating the position of the mobile terminal 3 compared to the above-described embodiment. In addition, in one exemplary operation, the mobile terminal 3 performs distance measurement communication with multiple BLE communication devices 7, while the smart key 2 performs distance measurement communication only with the gateway communication device. In other words, the number of BLE communication devices 7 with which the smart key 2 communicates during one position determination is smaller than the number of mobile terminals 3. The frequency of transmission of distance measurement signals from the smart key 2 is reduced compared to that from the mobile terminal 3. Therefore, according to the above configuration, power consumption in the smart key 2 can be reduced compared to the mobile terminal 3.

Figure 15:
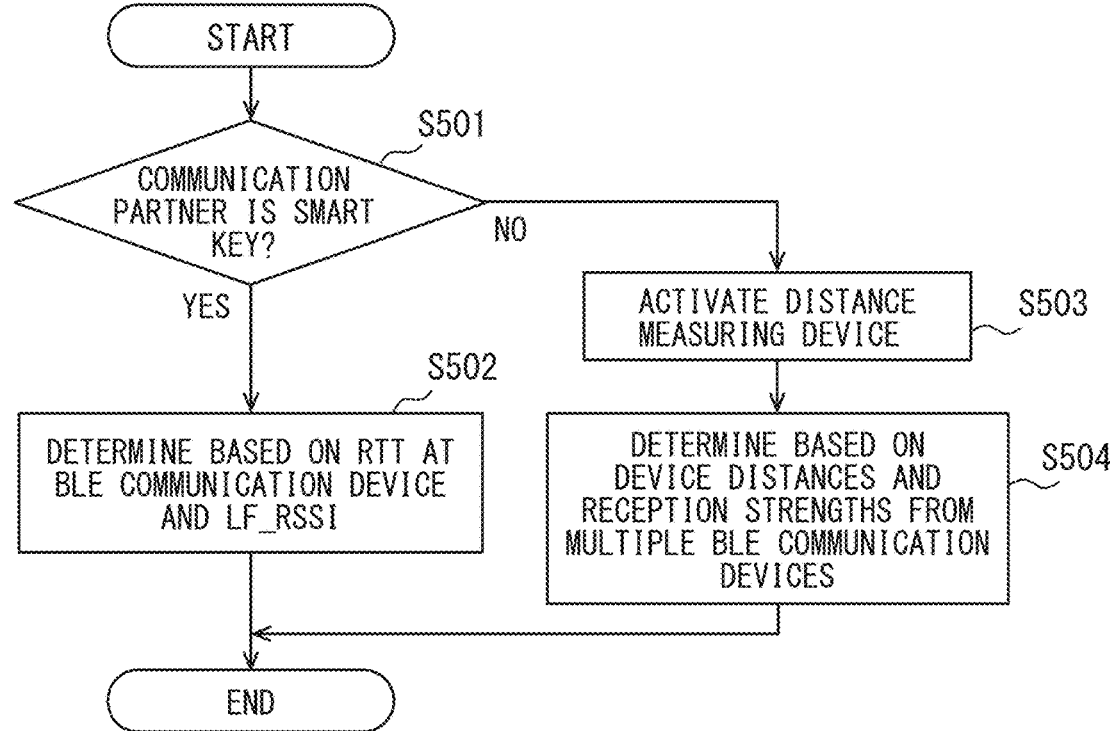
FIG. 15 is a flowchart illustrating an example of an operation of a processor in response to a communication partner.

The process flow illustrated in FIG. 15 can be performed in parallel with, in combination with, or in place of various processes described above. A specific processing content of step S502 may be processing for determining the device position using an LF strength map, similar to the flow shown in FIG. 11. In step S504, it is determined that the mobile terminal 3 is present in an area corresponding to a communication device whose distance from the mobile terminal 3 is less than a predetermined value. The processor 41 determines that the mobile terminal 3 is present in the interior area when the device distance based on the BLE communication device 7p is within 0.6 meters. Furthermore, the processor 41 determines that the mobile terminal 3 is present in the right area EA_A when the device distance based on the BLE communication device 7a is within 0.6 meters. The processor 41 can determine that the device location is in the other area when there is no BLE communication device 7 whose distance from the mobile terminal 3 is less than a predetermined value.

<Additional Information on LF Transmission Device Placement>

Figure 16:
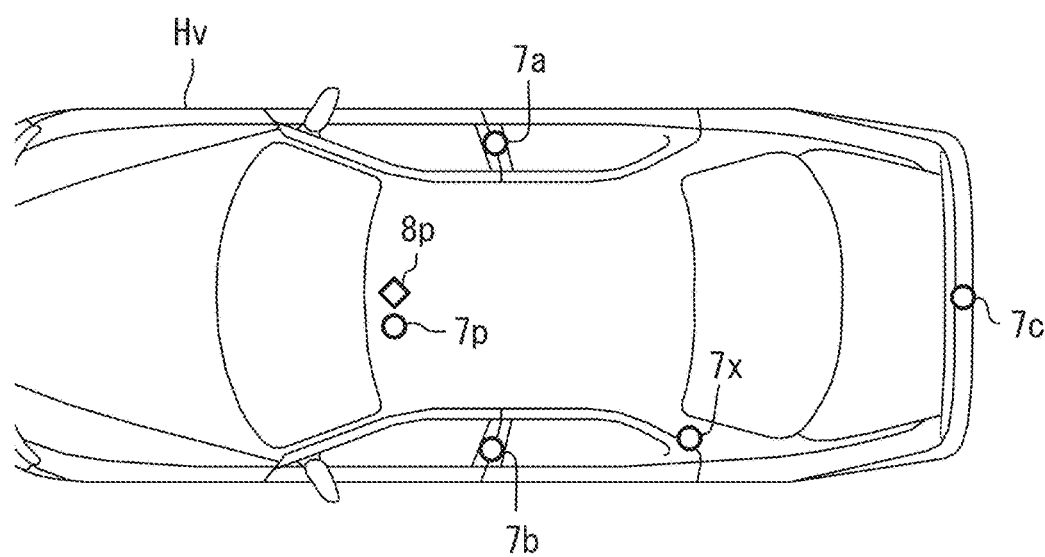
FIG. 16 is a diagram illustrating another modification of installation positions of BLE communication devices and LF transmission devices.

An arrangement number and an arrangement mode of the LF transmission device 8 described above are merely examples and can be appropriately changed. The LF transmission devices 8a, 8b may be disposed on an outer surfaces of the B-pillar and the C-pillar. Furthermore, the LF transmission device 8 arranged in the interior area may be only one LF transmission device 8p as shown in FIG. 16. The number of LF transmission devices 8 arranged inside the vehicle may be three or more. The in-vehicle system 1 may include an LF transmission device 8b disposed in the trunk.

First Modification

The smart key 2 and the mobile terminal 3 may transmit the device type code in response to an inquiry from the in-vehicle system 1. The device type code is a code indicating the type of the device, such as whether it is a smart key 2. In response to the query from the in-vehicle system 1, the smart key 2 can transmit a BLE signal in which a bit string indicating that the smart key 2 is a smart key 2 is placed in a data field where a device type code should be placed. The processor 41 may use the device type code instead of the device ID to determine whether the communication partner is a smart key 2.

The smart key 2 and the mobile terminal 3 may transmit, in addition to the device type code, an included function code indicating a variation of the communication function that they have in response to the inquiry from the in-vehicle system 1, instead of the device type code. The smart key 2 may be configured to, in response to the query from the in-vehicle system 1, transmit a BLE signal in which a bit string indicating that the smart key 2 has an LF receiving function is placed in a data field in which a function code should be placed. The processor 41 may use the provided function code instead of the device ID to determine whether the communication partner is a smart key 2. Furthermore, the processor 41 may switch the position determination algorithm depending on whether the communication partner has an LF receiving function. The processor 41 may determine the location using a strength map when the communication partner has the LF receiving function, but may determine the device location using a method that does not use the strength map when the communication partner does not have the LF receiving function.

Second Modification

The smart ECU 4 may be configured to be able to delete/invalidate the information of the smart key 2 from the key information storage unit M1 by a user operation. In the key information storage unit M1, only the mobile terminal 3 may be registered as the key device Kd.

Although the mobile terminal 3 is configured to be usable as a key device Kd in the above description, the present invention is not limited to this. The smart ECU 4 may be configured so that only the smart key 2 can be used as the key device Kd. In this case, the smart ECU 4 may be configured to end the flow if the smart key 2 cannot be found. More specifically, the processor 41 may be configured to execute a position determination process (S208) for the smart key when authentication of the communication partner is successful (FIG. 10, S206, YES).

Other Modification

The smart key 2 is generally configured to operate on a primary battery. In consideration of such circumstances, when the communication partner is the smart key 2, the power consumption in the communication partner may be further reduced than when the communication partner is the mobile terminal 3. This is because primary batteries are not rechargeable. Taking such circumstances into consideration, when the communication partner is the smart key 2, the processor 41 may reduce a frequency of distance measurement communication (for example, to less than half) compared to when the communication partner is the mobile terminal 3.

Moreover, the processor 41 does not necessarily need to obtain both the RTT and the transmission and reception phase difference. The processor 41 may determine the device distance based solely on the RTT. Moreover, the processor 41 may calculate the device distance based only on the two-frequency phase difference without using the RTT.

The functions of the smart ECU 4 may be divided into a position determination ECU that is responsible for determining the device position, and a vehicle control ECU that is responsible for coordinating the execution of vehicle control according to the position determination result. In this case, the position determination ECU transmits data indicating the position determination result of the key device Kd as the communication partner to the vehicle control ECU. The data can be received by the vehicle control ECU via the in-vehicle network Nw. The body ECU 12 and the power supply ECU 11 correspond to an example of a vehicle control ECU.

Alternatively, the second frequency band may be the 5.2 GHz band from 5150 MHz to 5250 MHz, or the 5.6 GHz band from 5470 MHz to 5730 MHz. The first frequency band may be any frequency band lower than the second frequency band, and a specific range thereof may be changed as appropriate.

The smart ECU 4 and the smart key 2 may be configured to calculate at least one of the RTT and the transmission and reception phase difference using the LF signal. The first data may be data on parameters related to the time of flight (ToF) of a wireless signal, such as the reception strength, the RTT, the transmission and reception phase difference, and the two-frequency phase difference. The first data and the second data may be data on parameters whose values change depending on the distances from the LF transmission device 8 and the BLE communication device 7 to the smart key 2. The first frequency band is not limited to the LF frequency band, but may be a frequency band of 900 MHz or higher. A term "device distance" in the above description can be appropriately replaced with a distance correspondence value, an RTT measured distance value, a phase difference measured distance value, or the like. The device distance, the distance correspondence value, the RTT measured distance value, and the phase difference measured distance value correspond to the measured distance value.

Supplementary Note (1)

The present disclosure also includes the following configurations.

Technical Idea 1

A control program including instructions for causing at least one processor of a mobile terminal (3), which is a general-purpose information processing terminal configured to be capable of wireless communication with a position determination device mounted on a vehicle, to execute processing related to a communication connection with the position determination device, and when a communication connection with the position determination device is established, to transmit and receive a signal for distance measurement periodically or upon request from the position determination device, and, upon establishment of a communication connection with the position determination device, to transmit a code indicating that the mobile terminal is not a vehicle mobile device.

The above control program is a control program for the mobile terminal 3, and the mobile terminal 3 operating according to the above control program transmits a signal indicating the device type to the smart ECU 4. According to this configuration, the smart ECU 4 can determine whether the communication partner is the smart key 2 or not, and has the advantage of being able to apply a determination method according to the type of communication partner.

Supplementary Note (2)

The device, the system, and the method described in the present disclosure may be implemented by a dedicated computer that is configured by a processor programmed to execute one or more functions by executing a computer program. The device and the method described in the present disclosure may be implemented using a dedicated hardware logic circuit. Furthermore, the device and the method thereof described in the present disclosure may be implemented by one or more dedicated computers including a combination of a processor that executes a computer program and one or more hardware logic circuits. For example, some or all of the functions provided by the processor 41 may be realized as hardware. A configuration in which a certain function is implemented by hardware includes a configuration in which the function is implemented by use of one or more ICs or the like. As the processor (arithmetic core), a CPU, an MPU, a GPU, a DFP (Data Flow Processor), or the like can be adopted. Some or all of the functions of the processor 41 may be implemented using a system-on chip (SoC), an FPGA, an ASIC, or the like. The FPGA is an abbreviation for Field Programmable Gate Array. The ASIC is an abbreviation for Application Specific Integrated Circuit. Further, the computer program may be stored in a computer-readable non-transitionary tangible storage medium as an instruction executed by the computer. As a program storage medium, an HDD (Hard-disk Drive), an SSD (Solid State Drive), a flash memory, or the like can be adopted.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A position determination device including at least one processor and a determination data storage unit storing determination data, wherein the at least one processor is used in connection with a plurality of first communication device configured to transmit a signal in a first frequency band, and at least one second communication device configured to communicate with a vehicle mobile device carried by a user of the vehicle using radio waves in a second frequency band different from the first frequency band, the determination data is a data set associating, for each of the plurality of first communication devices, the first data and the second data that can be observed when the vehicle mobile device is present within a predetermined target area, the at least one second communication device is configured to communicate with a mobile terminal which is a general-purpose information processing terminal in addition to the vehicle mobile device, the mobile terminal is used as an electronic key for the vehicle, the at least one processor is configured to cause the position determination device to:

acquire first data indicating a reception state at the vehicle mobile device of a signal transmitted by the first communication device;

acquire second data indicating a distance from the second communication device to the vehicle mobile device, the second data being determined by causing the second communication device to communicate with the vehicle mobile device;

determine a location of the vehicle mobile device based on the first data and the second data;

determine whether the vehicle mobile device is located within the target area by comparing actually observed first data and the second data with the determination data;

acquire a signal indicating a device type from a communication partner in cooperation with the second communication device;

determine whether a device type of the communication partner corresponds to the vehicle mobile device based on the signal acquired from the communication partner; and change an algorithm for determining a position of a communication partner depending on whether the device type of the communication partner is the vehicle mobile device.

2. The position determination device according to claim 1, wherein the at least one processor is configured to cause the position determination device to:

determine the location of the communication partner using the determination data when the device type of the communication partner is the vehicle mobile device; and determine the location of the communication partner without using the determination data when the communication partner is the mobile terminal.

3. The position determination device according to claim 1, wherein the first data is data indicating a reception strength of a wireless signal in the first frequency band observed by the vehicle mobile device.

4. The position determination device according to claim 1, wherein the at least one processor is configured to cause the position determination device to:

acquire, as the second data, data indicating a round trip time, which is a time from transmitting a response request signal to the vehicle mobile device to receiving a response signal from the vehicle mobile device; and determine that the vehicle mobile device is not present in a predetermined target area when the round trip time is greater than or equal to a predetermined value.

5. The position determination device according to claim 1, wherein the at least one processor is configured to cause the position determination device to:

acquire, as the second data, data indicating a transmission and reception phase difference for each of frequencies obtained by transmitting and receiving continuous wave signals at the frequencies in the second frequency band;

acquire a phase difference measured distance value indicating a distance from the second communication device to the vehicle mobile device based on the transmission and reception phase difference for each frequency; and determine that the vehicle mobile device is not present in a predetermined target area when the phase difference measured distance value is equal to or greater than a predetermined value.

6. The position determination device according to claim 1, wherein the at least one processor is configured to cause the position determination device to:

acquire, as the second data, data indicating a round trip time, which is a time from transmitting a response request signal to the vehicle mobile device to receiving a response signal from the vehicle mobile device;

acquire, as the second data, data indicating a transmission and reception phase difference for each of frequencies obtained by transmitting and receiving continuous wave signals at the frequencies in the second frequency band;

acquire a phase difference measured distance value indicating a distance from the second communication device to the vehicle mobile device based on the transmission and reception phase difference for each frequency; and determine that the vehicle mobile device is not present in a predetermined target area when the round trip time is equal to or greater than a predetermined value, or when the phase difference measured distance value is equal to or greater than a predetermined value and the round trip time is less than the predetermined value.

7. The position determination device according to claim 6, wherein the at least one processor is configured to cause the position determination device to perform a position determination process of the vehicle mobile device using the first data when the round trip time is less than the predetermined value and the phase difference measured distance value is less than the predetermined value.

8. A position determination device including at least one processor, wherein the at least one processor is used in connection with at least one first communication device configured to transmit a signal in a first frequency band, and at least one second communication device configured to communicate with a vehicle mobile device carried by a user of the vehicle using radio waves in a second frequency band different from the first frequency band, the at least one processor is configured to cause the position determination device to:

acquire first data indicating a reception state at the vehicle mobile device of a signal transmitted by the first communication device;

acquire second data indicating a distance from the second communication device to the vehicle mobile device, the second data being determined by causing the second communication device to communicate with the vehicle mobile device;

determine a location of the vehicle mobile device based on the first data and the second data;

acquire, as the second data, data indicating a round trip time, which is a time from transmitting a response request signal to the vehicle mobile device to receiving a response signal from the vehicle mobile device;

acquire, as the second data, data indicating a transmission and reception phase difference for each of frequencies obtained by transmitting and receiving continuous wave signals at the frequencies in the second frequency band;

acquire a phase difference measured distance value indicating a distance from the second communication device to the vehicle mobile device based on the transmission and reception phase difference for each frequency; and determine that the vehicle mobile device is not present in a predetermined target area when the round trip time is equal to or greater than a predetermined value, or when the phase difference measured distance value is equal to or greater than a predetermined value and the round trip time is less than the predetermined value; and perform a position determination process of the vehicle mobile device using the first data when the round trip time is less than the predetermined value and the phase difference measured distance value is less than the predetermined value.

9. The position determination device according to claim 1, wherein the at least one processor is configured to cause the position determination device to:

cause the first communication device to transmit a wireless signal for initiating communication with the second communication device to the vehicle mobile device in response to input of a signal indicating that a predetermined operation member provided in the vehicle has been operated or periodically;

cause the second communication device to perform distance measurement communication in response to establishment of a communication connection between the vehicle mobile device and the second communication device; and acquire the second data as a result of the distance measurement communication.

10. The position determination device according to claim 1, wherein the first frequency band is a lower frequency band than the second frequency band.

11. The position determination device according to claim 1, wherein the first frequency band is part or whole of 20 KHz to 300 kHz, and the second frequency band is a 2.4 GHz band.

12. The position determination device according to claim 1, wherein the at least one processor is configured to cause the position determination device to perform a predetermined vehicle control according to the position of the vehicle mobile device based on a result of determining the position of the vehicle mobile device.

13. The position determination device according to claim 1, wherein the at least one processor is configured to cause the position determination device to transmit data indicating a result of determining a position of the vehicle mobile device to another device mounted in the vehicle.

14. A position determination method performed by at least one processor used in connection with a plurality of first communication device configured to transmit a signal in a first frequency band and at least one second communication device configured to communicate with a vehicle mobile device and a mobile terminal carried by a user of the vehicle using radio waves in a second frequency band different from the first frequency band, wherein determination data is a data set associating, for each of the plurality of first communication devices, the first data and the second data that can be observed when the vehicle mobile device is present within a predetermined target area, the at least one second communication device is configured to communicate with a mobile terminal which is a general-purpose information processing terminal in addition to the vehicle mobile device, the position determination method comprising:

acquiring first data from the vehicle mobile device indicating a reception state at the vehicle mobile device of a signal transmitted by the first communication device;

acquiring second data indicating a distance from the second communication device to the vehicle mobile device, the second data being determined by causing the second communication device to communicate with the vehicle mobile device;

determining a location of the vehicle mobile device based on the first data and the second data;

determine whether the vehicle mobile device is located within the target area by comparing actually observed first data and the second data with the determination data;

acquire a signal indicating a device type from a communication partner in cooperation with the second communication device;

determine whether a device type of the communication partner corresponds to the vehicle mobile device based on the signal acquired from the communication partner; and change an algorithm for determining a position of a communication partner depending on whether the device type of the communication partner is the vehicle mobile device.

15. A position determination method performed by at least one processor used in connection with at least one first communication device configured to transmit a signal in a first frequency band and at least one second communication device configured to communicate with a vehicle mobile device carried by a user of the vehicle using radio waves in a second frequency band different from the first frequency band, the position determination method comprising:

acquiring first data from the vehicle mobile device indicating a reception state at the vehicle mobile device of a signal transmitted by the first communication device;

acquiring second data indicating a distance from the second communication device to the vehicle mobile device, the second data being determined by causing the second communication device to communicate with the vehicle mobile device;

determining a location of the vehicle mobile device based on the first data and the second data;

acquiring, as the second data, data indicating a round trip time, which is a time from transmitting a response request signal to the vehicle mobile device to receiving a response signal from the vehicle mobile device;

acquiring, as the second data, data indicating a transmission and reception phase difference for each of frequencies obtained by transmitting and receiving continuous wave signals at the frequencies in the second frequency band;

acquiring a phase difference measured distance value indicating a distance from the second communication device to the vehicle mobile device based on the transmission and reception phase difference for each frequency; and determining that the vehicle mobile device is not present in a predetermined target area when the round trip time is equal to or greater than a predetermined value, or when the phase difference measured distance value is equal to or greater than a predetermined value and the round trip time is less than the predetermined value; and performing a position determination process of the vehicle mobile device using the first data when the round trip time is less than the predetermined value and the phase difference measured distance value is less than the predetermined value.

16. A vehicular electronic key system comprising:

a position determination device including at least one processor used in connection with at least one first communication device configured to transmit a signal in a first frequency band and at least one second communication device configured to perform wireless communication using radio waves in a second frequency band different from the first frequency band;

a vehicle mobile device, which is a dedicated device for a user to operate a vehicle, configured to receive a signal transmitted from the first communication device and perform the wireless communication using the second frequency band; and a mobile terminal, which is a general-purpose information processing terminal, configured to perform the wireless communication using the second frequency band, wherein the vehicle mobile device is configured to:

activate based on receiving a signal in the first frequency band, and then initiate a wireless communication connection with the position determination device using the radio waves in the second frequency band;

transmit data indicating a reception strength of a signal in the first frequency band by the wireless communication using the second frequency band;

transmit a code indicating that a device type is the vehicle mobile device based on establishment of a communication connection with the position determination device; and transmit and receive a signal for distance measurement with the second communication device when a communication connection with the position determination device has been established, the mobile terminal is configured to:

perform processing related to a communication connection with the position determination device using the radio waves in the second frequency band;

transmit and receive a signal for distance measurement with the second communication device when a communication connection with the position determination device has been established; and transmit a code indicating that a device type is not the vehicle mobile device based on establishment of a communication connection with the position determination device, the position determination device is configured to:

acquire second data indicating a distance from the second communication device to a communication partner, the second data being determined by causing the second communication device to carry out a predetermined distance measurement communication;

acquire a signal indicating the device type from the communication partner using the second communication device;

determine whether the device type of the communication partner corresponds to the vehicle mobile device based on the signal acquired from the communication partner;

acquire first data from the vehicle mobile device as the communication partner, the first data indicating a reception status of the vehicle mobile device with respect to a signal transmitted from the first communication device when the device type of the communication partner is the vehicle mobile device; and determine a location of the vehicle mobile device based on the first data and the second data when the device type of the communication partner is the vehicle mobile device.

* * * * *